_(12)_ United States Patent
Okada

(10) Patent No.: US 6,807,143 B1
(45) Date of Patent: Oct. 19, 2004

(54) INFORMATION-RECORDING MEDIUM AND INFORMATION REPRODUCING APPARATUS

(75) Inventor: Mitsuya Okada, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/529,706

(22) PCT Filed: Jul. 5, 1999

(86) PCT No.: PCT/JP99/03625

§ 371 (c)(1),
(2), (4) Date: Apr. 17, 2000

(87) PCT Pub. No.: WO00/02197

PCT Pub. Date: Jan. 13, 2000

(30) Foreign Application Priority Data

Jul. 6, 1998 (JP) .......................................... 10-190074

(51) Int. Cl.[7] .................................................. G11B 7/00
(52) U.S. Cl. .................................. 369/275.3; 369/47.27
(58) Field of Search .......................... 369/13.55, 275.1, 369/275.3, 275.4, 53.2, 44.26, 47.27, 53.31, 59.23, 59.25, 124.1, 124.2, 124.3, 44.29, 44.35, 44.36

(56) References Cited

U.S. PATENT DOCUMENTS 5,508,995 A * 4/1996 Moriya et al. ........... 369/275.4
6,118,752 A * 9/2000 Miyagawa et al. ....... 369/275.3

FOREIGN PATENT DOCUMENTS

| JP | 58-166538 | 10/1983 |
|----|-----------|---------|
| JP | 1-286122 | 11/1989 |
| JP | 5-166739 | 7/1993 |
| JP | 8-315369 | 11/1996 |
| JP | 9-73635 | 3/1997 |
| JP | 9-147366 | 6/1997 |
| JP | 10-177743 | 6/1998 |

OTHER PUBLICATIONS

K. Kayanuma, et al., "High track density magneto-optical recording using a crosstalk canceler", SPIE Proceedings vol. 1316 Optical Data Storage (1990), pp. 35–39.

* cited by examiner

Primary Examiner—Thang V. Tran
Assistant Examiner—Bach Vuong
(74) Attorney, Agent, or Firm—McGinn & Gibb, PLLC

(57) ABSTRACT

An information recording medium and an information reproduction apparatus that can substantially increase the capacity for recorded information. A preformat pit array 202 exists on the extension of the boundary between a concave portion 103 and a convex portion 104 and includes information on both sectors across the boundary. An adjustment pit array 201 precedes the preformat pit array 202 in the advancing direction of light that reproduces information recorded on an information recording medium. The information reproduction apparatus adjusts the amplifying rate so that the level of a signal from the adjustment pit array 201 becomes equal to a reference level required to reproduce the information correctly. The apparatus then uses this amplifying rate to correctly reproduce the information in the preformat pit array 202.

30 Claims, 19 Drawing Sheets

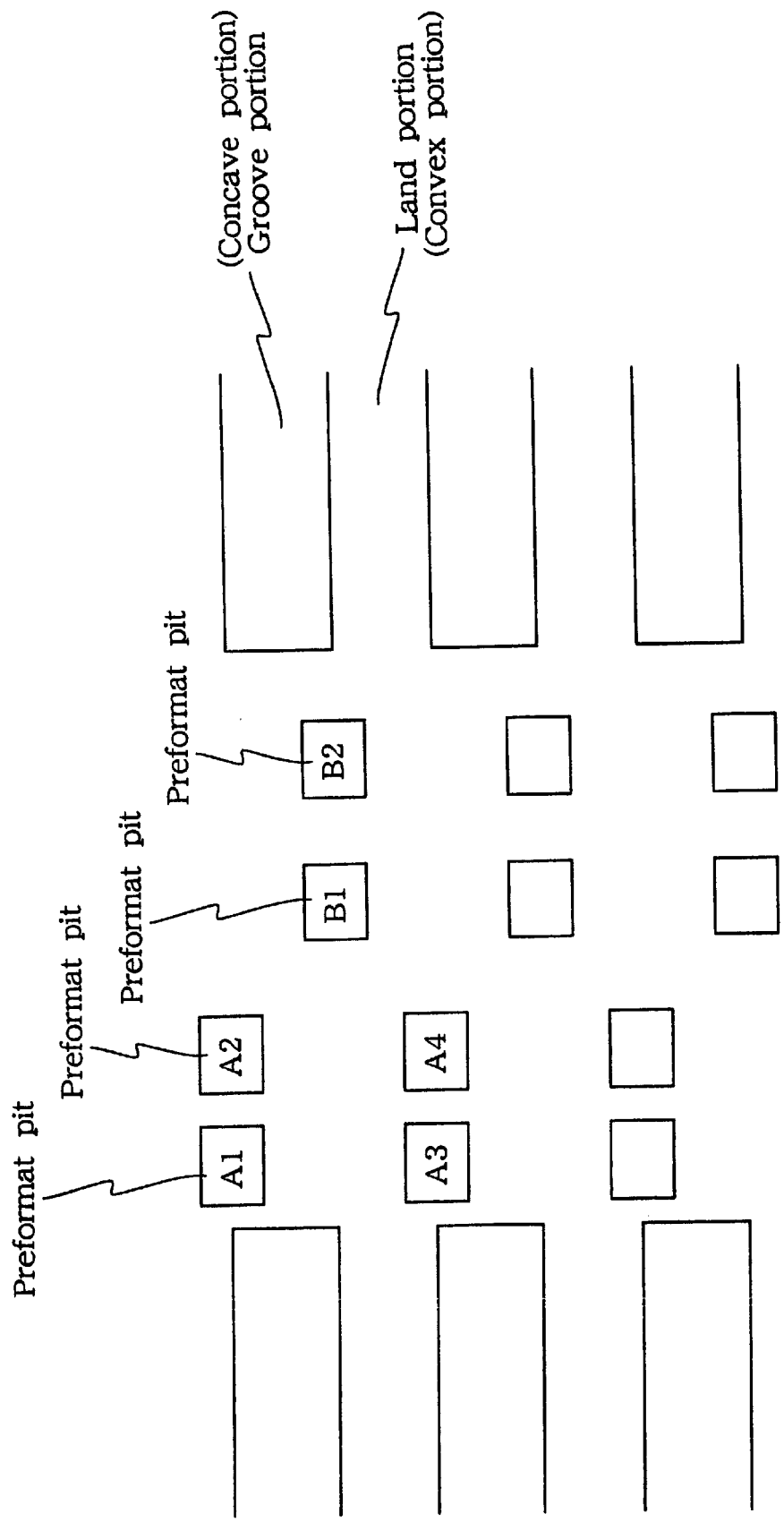

INFORMATION-RECORDING MEDIUM AND INFORMATION REPRODUCING APPARATUS

BACKGROUND OF THE INVENTION

1. Field of the Invention

The present invention relates to an information recording medium in which information is recorded on a recording film using laser light and in which information recorded on the recording film is reproduced or erased, as well as an information reproduction apparatus for reproducing information recorded on the information recording medium, and in particular, to an information recording medium and an information reproduction apparatus that enable high density information to be recorded.

2. Description of the Prior Art

Magneto-optical discs and DVD-RAMs are known as information recording media in which information is recorded on a recording film using laser light and in which information recorded on the recording film is reproduced or erased.

The conventional information recording medium is composed of land portions on which information is recorded and groove portions each separating a land portion from the adjacent land portion, wherein the land and groove portions form an irregular pattern. The land and groove portions each form one track, which is divided into several tens of sectors. Pits called "preformat pits" indicating the track number of each sector are formed at the head of the sector.

If the track pitch (the interval between the land and groove portions) is reduced in order to improve the density of information recorded on the information recording medium, crosstalks (when information recorded on a certain track is to be reproduced, information recorded on the adjacent track is simultaneously read) may increase.

Japanese Patent Laid-Open No. 1-286122 and Japanese Patent Laid-Open No. 5-166739 specifications disclose methods for reducing crosstalks.

The method disclosed in Japanese Patent Laid-Open No. 1-286122 specification arranges adjacent preformats in such a way as to be alternately offset from one another.

The method disclosed in Japanese Patent Laid-Open No. 5-166739 specification forms preformats convex from recording tracks.

In addition, the land groove recording method for recording information on both the land and groove portions is favorable in improving the density of information recorded on an information recording medium. K. Kayanuma et al have reported the effectiveness of this method (SPIE Proceedings Vol. 1316, p.35).

The method for recording information on both the land and groove portions has already been employed for DVD-RAMs. In the VD-RAM, the preformat pits are formed on the extension of the boundary between the land and groove portions. FIG. 19 is an enlarged view of a preformat portion in the DVD-RAM showing an arrangement of preformat pits. As shown in FIG. 19, the preformat pits are formed in a flat portion in which the groove of the groove portion is discontinued, and four preformat pits are formed for one sector. Specifically, four preformat pits A1, A2, B1, and B2 are formed for the concave (groove) sector, while four preformat pits A3, A4, B1, and B2 are formed for the adjacent convex (land) sector. The two preformat pits formed on the extension of the boundary between the concave and convex portions are shared by the adjacent concave and convex sectors.

Even in such an information recording medium based on the land groove recording method, if the track pitch is reduced in order to improve the recording density, crosstalks may increase, thereby making it difficult for precluding good preformat pits to be formed.

Japanese Patent Laid-Open No. 9-73635 and Japanese Patent Laid-Open No. 9-147366 specifications disclose methods for reducing crosstalks.

The method disclosed in Japanese Patent Laid-Open No. 9-73635 specification forms preformat pits for both the land and groove portions and pairs two adjacent tracks so that the arrangement of pre-pits is the same within each of the pairs while it is different between adjacent pairs in order to reduce the extent to which a laser spot used to reproduce information is applied on the pre-pits for the adjacent track. Moreover, the polarity of signals of the pre-pits is reversed between adjacent pairs in order to reduce crosstalks in the preformat portion.

The method disclosed in Japanese Patent Laid-Open No. 9-147366 specification reduces crosstalks by comparing the amount of light reflected from wobble pits arranged at positions prior to an identifying signal section and on the right and left side of the center line of a track to increase the accuracy of track follow-up control for the laser spot in order to avoid off-tracks. In addition, the wobble pits are located at positions followed and preceded by a synchronizing signal section and the identifying signal section. Processes carried out by a reproduction apparatus occurs at space or time interval between the detection of a synchronizing signal and the detection of a signal from the wobble pits and between the detection of the signal from the wobble pits and the detection of an identifying signal. A certain interval is provided before and after the wobble pits corresponding to a distance over which the laser spot advances while the reproduction apparatus is executing the above processing. The off-track means that the laser spot scanning deviated from the track from which information is being reproduced due to the decentering of an information recording medium itself or a rotating shaft of a motor rotating the information recording medium during information reproduction. When the off-track occurs, the area of preformat pits covered by the laser spot may be reduced causing to decrease the intensity of information reproduced.

BRIEF SUMMARY OF THE INVENTION

Object of the Invention

As described above, in the DVD-RAM, when the track pitch is reduced in order to improve the density of information recorded, crosstalks or off-tracks may increase.

In addition, the method disclosed in Japanese Patent Laid-Open No. 9-73635 specification reduces crosstalks but cannot avoid the decrease in the level of reproduced signals caused by off-tracks.

Also, the method disclosed in Japanese Patent Laid-Open No. 9-147366 specification executes processing for the follow-up control for the laser spot. But this method must provide the interval for this processing in the preformat portion. Consequently, the area of the preformat portion increases to reduce the sector utilization.

An object of this invention is to solve these problems and to provide an information recording medium and an information reproduction apparatus that allow the capacity for information recorded to be increased easily.

SUMMARY OF THE INVENTION

To attain this object, an information recording medium according to a first aspect of this invention is characterized by comprising a preformat pit array existing on the extension of the boundary between adjacent recording tracks and containing information on both recording tracks sandwiching the boundary, and an adjustment pit existing at a position prior to the preformat pit array relative to the advancing direction of light that reproduces recorded information, adjusting the signal level of a reproduced signal from the preformat pit array.

This aspect of the invention can correct the reproduced signal from the preformat pit array so as to have a signal level required to accurately reproduce information, based on the signal level of the reproduced signal from the adjustment pit array. Thus, the information recorded on the preformat pit array and subsequent sector can be reproduced correctly.

The adjustment pit may be formed at the extension of the boundary between adjacent tracks same as in the case of the preformat pit array or on the extension of an adjacent boundary and may be a single or a plurality of pit arrays.

An information reproduction apparatus according to a second aspect of this invention is characterized by comprising a preformat pit array existing on the extension of the boundary between adjacent recording tracks and comprising information on both recording tracks sandwiching the boundary, and an adjustment pit existing at a position prior to the preformat pit array relative to the advancing direction of light that reproduces recorded information, existing on both the extension of the boundary same as in the case of the preformat pit array and the extension of an adjacent boundary, adjusting the signal level of a reproduced signal from the preformat pit array.

This aspect of the invention can show how the center of light is deviated from the center line of a track, based on the signal level of the reproduced signal from the adjustment pit array. By correcting the reproduced signal from the preformat pit array that has been varied due to this offset, so as to have a signal level required to reproduce information correctly, this aspect of the invention can correctly reproduce the information recorded on the preformat pit array and subsequent sector.

The adjustment pit may comprise a single pit or an array of continuous pit array.

An information reproduction apparatus according to a third aspect of this invention is an information reproduction apparatus for reproducing information recorded on an information recording medium according to the first and second aspects of this invention, characterized in that a reproduction means for photoelectrically transforming light from the information recording medium to reproduce a signal recorded on the information recording medium, an amplifying means for amplifying the signal reproduced by the reproduction means, a level determining means for detecting the reproduced signal coming from the adjustment pit array, out of the output signal from the reproduction means in order to determine the signal level of this reproduced signal, and an amplifying rate adjustment means for adjusting the amplifying rate of the amplifying means according to the signal level determined by the level determining means and outputting the reproduced signal from the preformat pit array at a certain signal level.

This aspect of the invention can also correct the reproduced signal from the preformat pit array so as to have a signal level required to accurately reproduce information, based on the signal level of the reproduced signal from the adjustment pit array. Thus, the information recorded on the preformat pit array and subsequent sector can be reproduced correctly.

The amplifying means may amplify the sum of the signal levels of signals reproduced by a plurality of the reproduction means or the difference between the signal levels of signals reproduced by a plurality of the reproduction means.

An information reproduction apparatus according to a fourth aspect of this invention is an information reproduction apparatus for reproducing information recorded on an information recording medium according to the first and second aspects of this invention, characterized by comprising a reproduction means for reproducing signals recorded on the information recording medium, from light from the information recording medium, an amplifying means for amplifying the signals reproduced by the reproduction means, a level determining means for detecting from the output signals from the reproduction means the reproduced signals from the adjustment pit array existing on the extension of the boundary between adjacent tracks same as in the case of the preformat pit array and on the extension of an adjacent boundary in order to determine the signal level of each reproduced signal, and an amplifying rate adjustment means for adjusting the amplifying rate of the amplifying means according to the signal level determined by the level determining means and outputting the reproduced signals from the preformat pit array at predetermined signal levels.

This aspect of the invention can also show how the center of light is deviated from the center line of a track, based on the signal level of the reproduced signal from the adjustment pit array. By correcting the reproduced signal from the preformat pit array that has been varied due to this offset, so as to have a signal level required to reproduce information correctly, this aspect of the invention can correctly reproduce the information recorded on the preformat pit array and subsequent sector.

The level determining means may determine the signal levels of the reproduced signals from the adjustment pit array existing on the extension of the boundary between adjacent tracks same as in the case of the preformat pit array and on the extension of an adjacent boundary, based on the sum of the signal levels of signals reproduced by a plurality of the reproduction means or the difference between the signal levels of signals reproduced by a plurality of the reproduction means.

The amplifying means may amplify the sum of the signal levels of signals reproduced by a plurality of the reproduction means or the difference between the signal levels of signals reproduced by a plurality of the reproduction means.

BRIEF DESCRIPTION OF THE DRAWINGS

FIG. 19 is an enlarged view of a preformat portion of a conventional information recording medium.

DETAILED DESCRIPTION OF THE PREFERRED EMBODIMENTS

Next, embodiments of this invention will be described with reference to the attached drawings.

Figure 1:
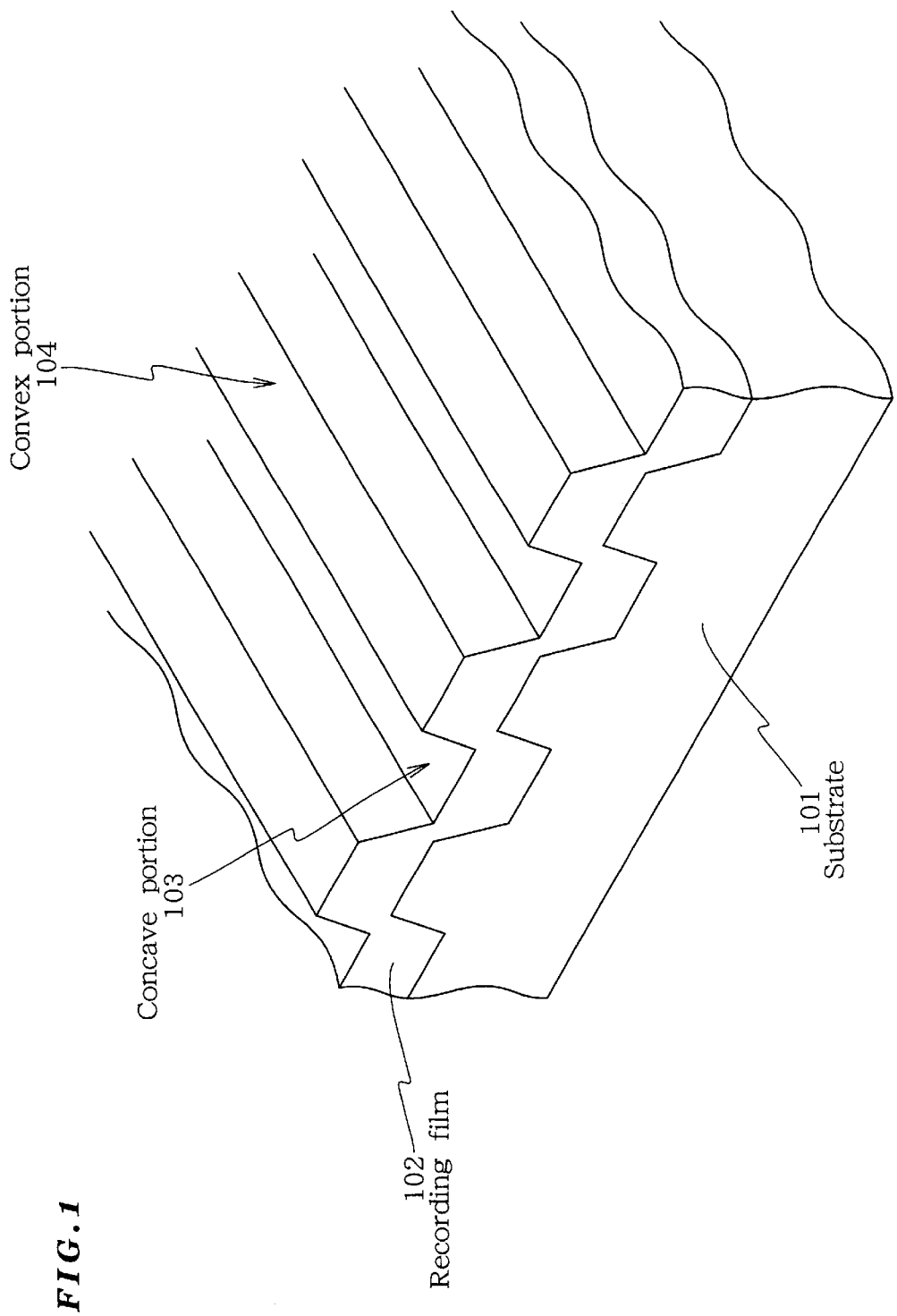
FIG. 1 is a configuration drawing of a cross section obtained by cutting an information recording medium according to the embodiments of this invention, perpendicularly to its surface.

FIG. 1 is a configuration drawing of a cross section obtained by cutting an information recording medium according to the embodiments of this invention, perpendicularly to its surface.

An information recording medium according to the embodiments of this invention is composed of a substrate 101 and a recording film 102 formed on the substrate 101 by means of lamination and on which information is recorded. As shown in FIG. 1, concave portions 103 and convex portions 104 form an irregular pattern on the surface of the information recording medium. The information recording medium is shaped like, for example, a disc so that a spiral or concentric irregular pattern is formed from the inner portion of the disc to the outer portion.

Each pair of the concave portion 103 and the convex portion 104 forms one track, which is divided into several tens of sectors. A preformat indicating the track number of each sector is formed at the head of the sector.

Figure 2:
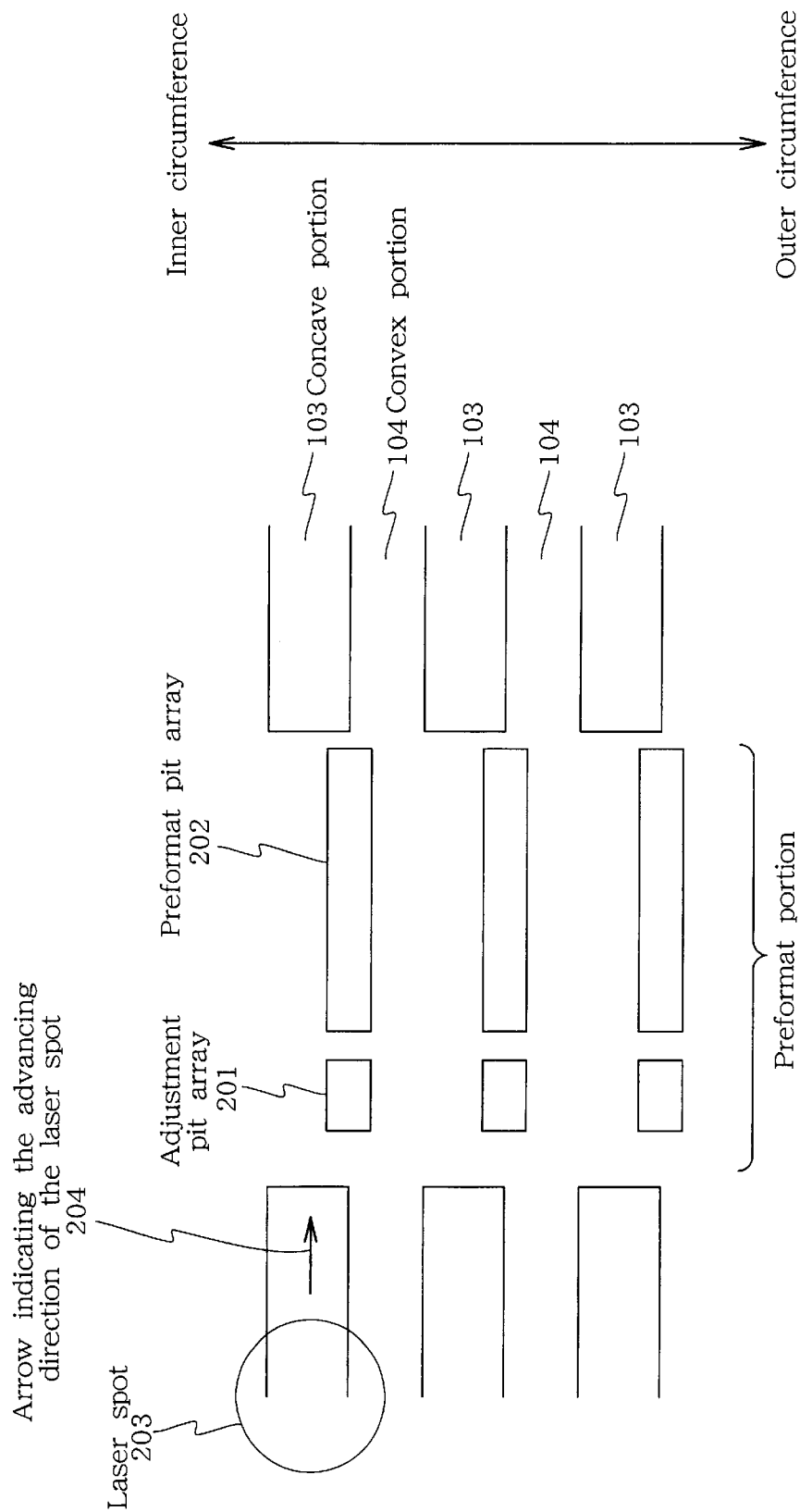
FIG. 2 is an enlarged view of a preformat portion of an information recording medium according to a first embodiment of this invention.

FIG. 2 is an enlarged view of a preformat portion of an information recording medium according to a first embodiment of this invention.

A preformat portion is composed of adjustment pit arrays 201 and preformat pit arrays 202 and is formed in a flat portion in which the groove of the concave portion 103 is discontinued. In addition, the adjustment pit arrays 201 and the preformat pit arrays 202 are formed on the extension of the boundary where the concave portion 103 shifts to the convex portion 104 from the inner circumference of the disc to its outer circumference. A laser spot 203 that records, reproduces, and deletes information scans in the direction shown by an arrow 204.

When the laser spot 203 passes over the adjustment pit array 201, the array 201 reflects light from the laser spot 203. The information reproduction apparatus reproduces a signal from the reflected light from the adjustment pit array 201 (photoelectrically transforms the optical signal). Since the adjustment pit array 201 is on the extension of the boundary between adjacent tracks same as in the case of the preformat pit array 202, the voltage of a reproduced signal from the adjustment pit array 201 is equal to the voltage of a reproduced signal from the preformat pit array 202. That is, the voltage of a reproduced signal from the preformat pit array 202 is determined based on a quantity of the reflected light from the preadjustment pit array 201. Accordingly, the adjustment pit array 201 only needs to have a function for reflecting light, and may comprise an arbitrary length of pit. For example, the adjustment pit array may be an isolated or a continuous pit having a length equivalent to any of the preformat pit arrays 202 or a pit having a length that is not used for the preformat pit arrays 202.

Figure 3:
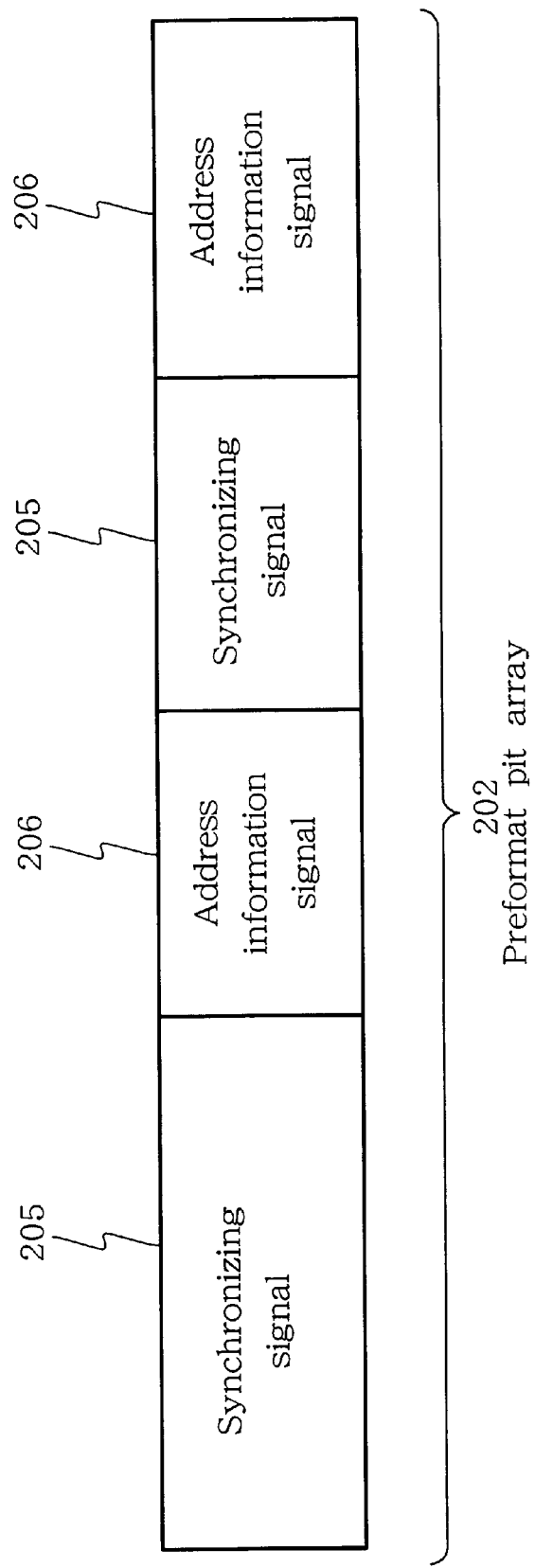
FIG. 3 is a configuration drawing of a preformat pit array of the information recording medium according to the first embodiment of this invention.

FIG. 3 shows a configuration of the preformat pit array 202 shown in FIG. 2. The preformat pit array 202 is composed of synchronizing signals 205 and address information signals 206 existing on the extension of the boundary between the concave and convex portions 103 and 104 besides being related to both sectors of the concave and convex portions 103 and 104 required to record and reproduce information, as shown in FIG. 2. The preformat pit array 202 is used by both sectors of the concave and convex portions 103 and 104.

According to the information recording medium of such a configuration, the center of the laser spot 203 does not pass through the center of the preformat pit array 202 and scanning is shifted either rightward or leftward. To accurately reproduce the information recorded on each sector, the information in the preformat pit array 202 must be accurately reproduced. A problem that may occur during the reproduction of actually recorded information is an off-track (due to the decentering of the information recording medium itself or the rotating shaft of a motor that rotates the information recording medium during information reproduction, the laser spot may be shifted from the track from which it is reproducing information) that may substantially vary the voltage of the reproduced signal to prevent the synchronizing signal or address information signal in the preformat pit array 202 from being read accurately.

Next, an information reproduction apparatus will be described that can prevent the voltage of the reproduced signal from varying using the information recording medium configured as described above.

Figure 4:
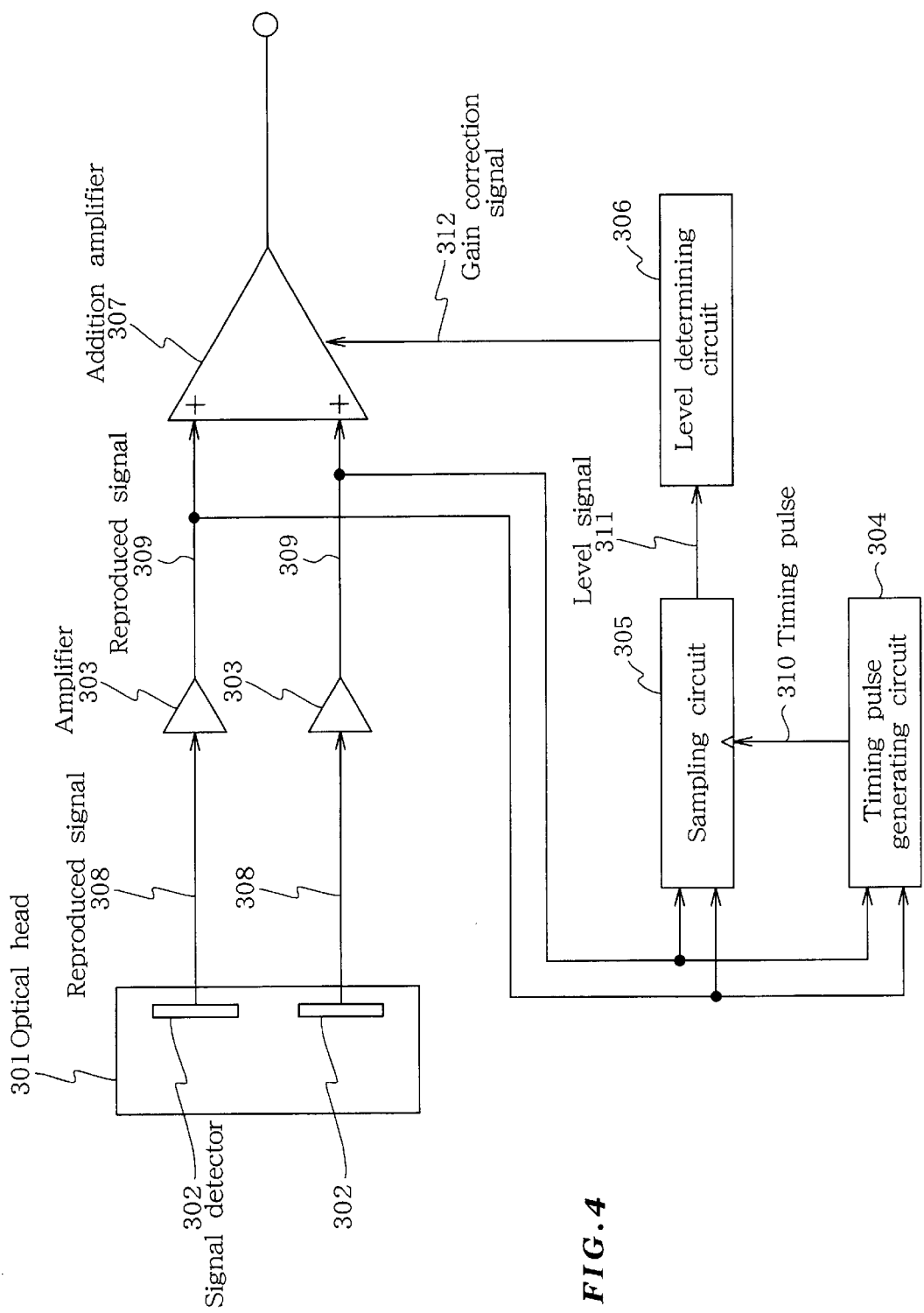
FIG. 4 is a circuit block diagram of the information reproduction apparatus according to the first embodiment of this invention.

This information reproduction apparatus is composed of an optical head 301, two signal detectors 302, two amplifiers 303, a timing pulse generating circuit 304, a sampling circuit 305, a level determining circuit 306, and an addition amplifier 307, as shown in FIG. 4.

The optical head 301 includes two signal detectors (photoelectric transfer elements) 302.

The signal detectors 302 photoelectrically transforms reflected light from the adjustment pit array 201 to generate reproduced signals (voltage signals), and input them to the two amplifiers 303 as reproduced signals 308.

The amplifier 303 amplifies the input reproduced signal 308 at a certain rate to obtain a reproduced signal 309, and inputs it to the timing pulse generating circuit 304, the sampling circuit 305, and the addition amplifier 307.

Based on the reproduced signal 309, the timing pulse generating circuit 304 detects the rising edge of the reproduced signal from the adjustment pit array 201, subsequently generates a pulse that coincides with the rising edge, and then outputs this timing pulse 310 to the sampling circuit 305.

In response to the timing pulse 310, the sampling circuit 305 samples and holds the reproduced signal 309 from the adjustment pit array 201 (a signal generated by photoelectrically transforming the reflected light from the adjustment pit array 201) and outputs a signal of a certain pulse width having the sampled voltage, to the level determining circuit 306 as a level signal 311.

The level determining circuit 306 adjusts a gain correction signal 312 depending on the voltage of the level signal 311 and sets the amplifying rate of the addition amplifier 307 at a value corresponding to the voltage of the level signal 311. The amplifying rate corresponding to the voltage of the level signal 311 is a value that sets the voltage of the level signal 311 at a value required to reproduce the signal correctly.

The addition amplifier 307 sums up the voltages of the reduced signals 309, adjusts the gain according to the gain correction signal 312, and correctly reproduces the reproduced signal from the preformat pit array 202 using this gain.

Figure 5:
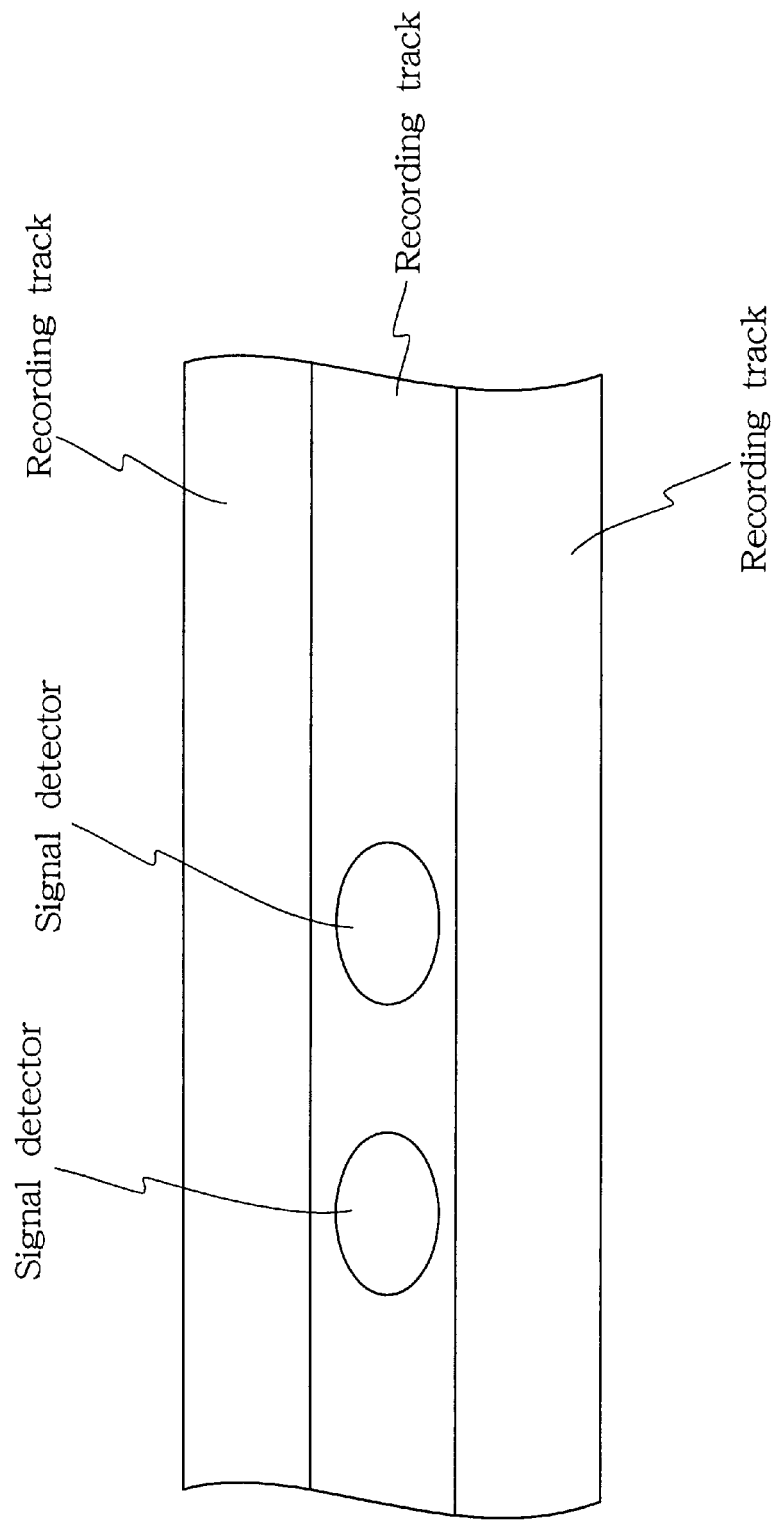
FIG. 5 shows an example of the arrangement of signal detectors of an information reproduction apparatus according to the embodiments of this invention.
Figure 6:
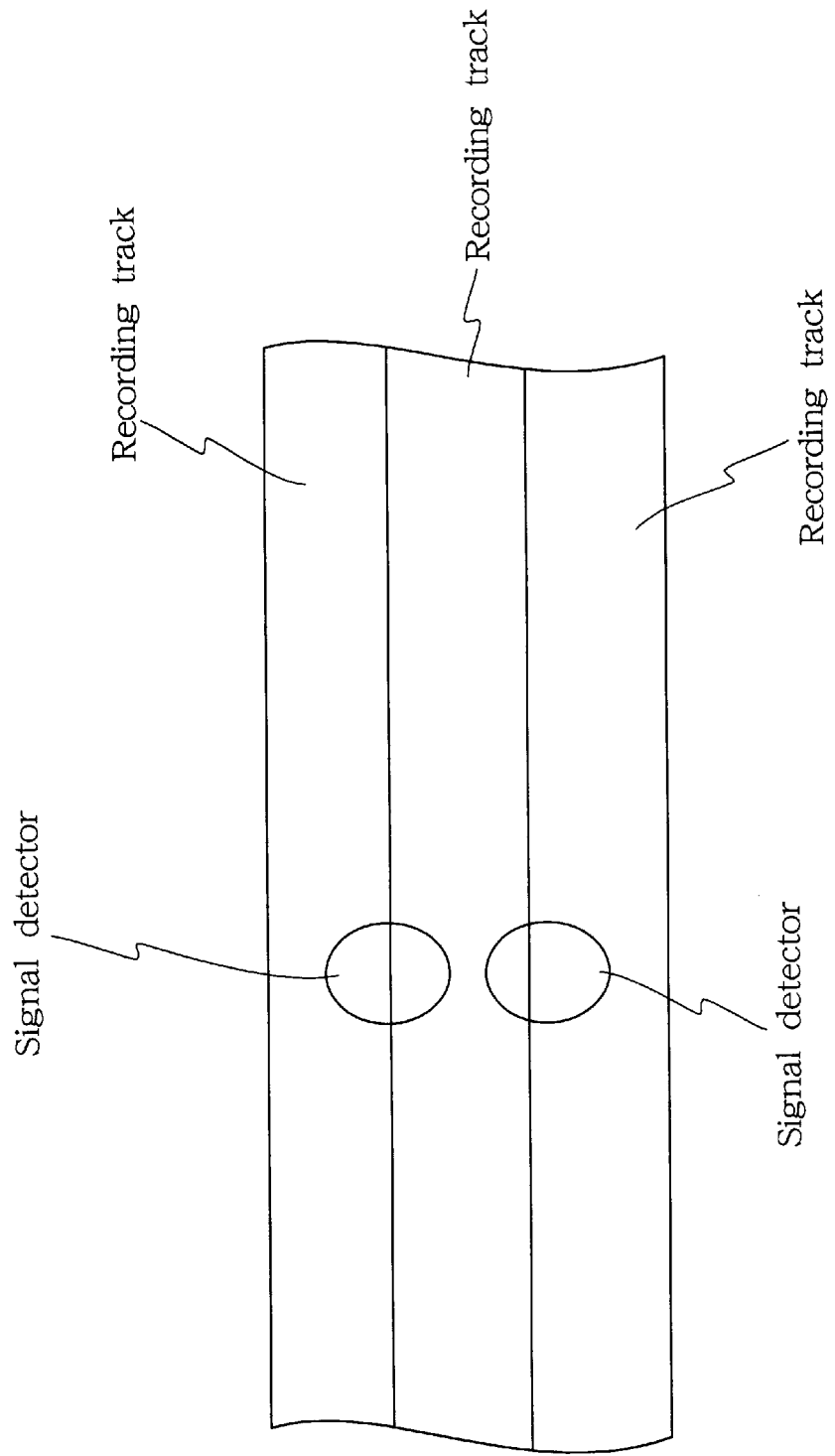
FIG. 6 shows an example of the arrangement of signal detectors of an information reproduction apparatus according to the embodiments of this invention.
Figure 7:
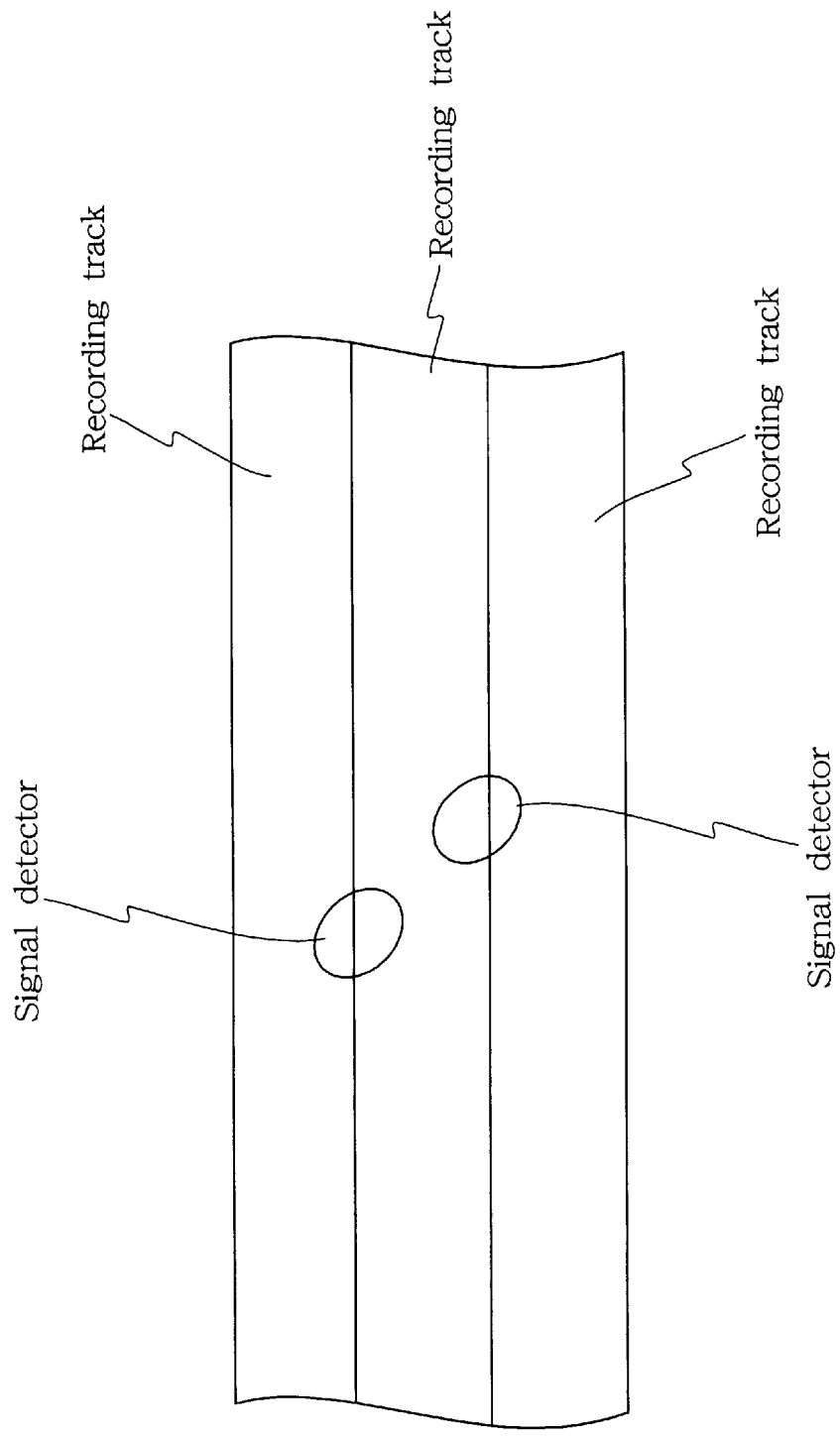
FIG. 7 shows an example of the arrangement of signal detectors of an information reproduction apparatus according to the embodiments of this invention.

The signal detectors 302 are arranged at positions suitable for detecting recorded information from reflected light. For example, although FIG. 5 shows the relative locational relationship between recording tracks and the signal detectors, the signal detectors 302 may be relatively arranged in parallel with the recording tracks, perpendicularly to them as shown in FIG. 6, or diagonally relative to them as shown in FIG. 7. The number of the signal detectors 302 may be larger than two. Although FIGS. 5, 6, and 7 show circular or elliptic signal detectors, the shape of the signal detectors is not limited to these examples, and may be a semicircle, a rectangle, a square, a crescent, a semi-ring, or a ring or combinations of such shapes, etc.

Figure 8:
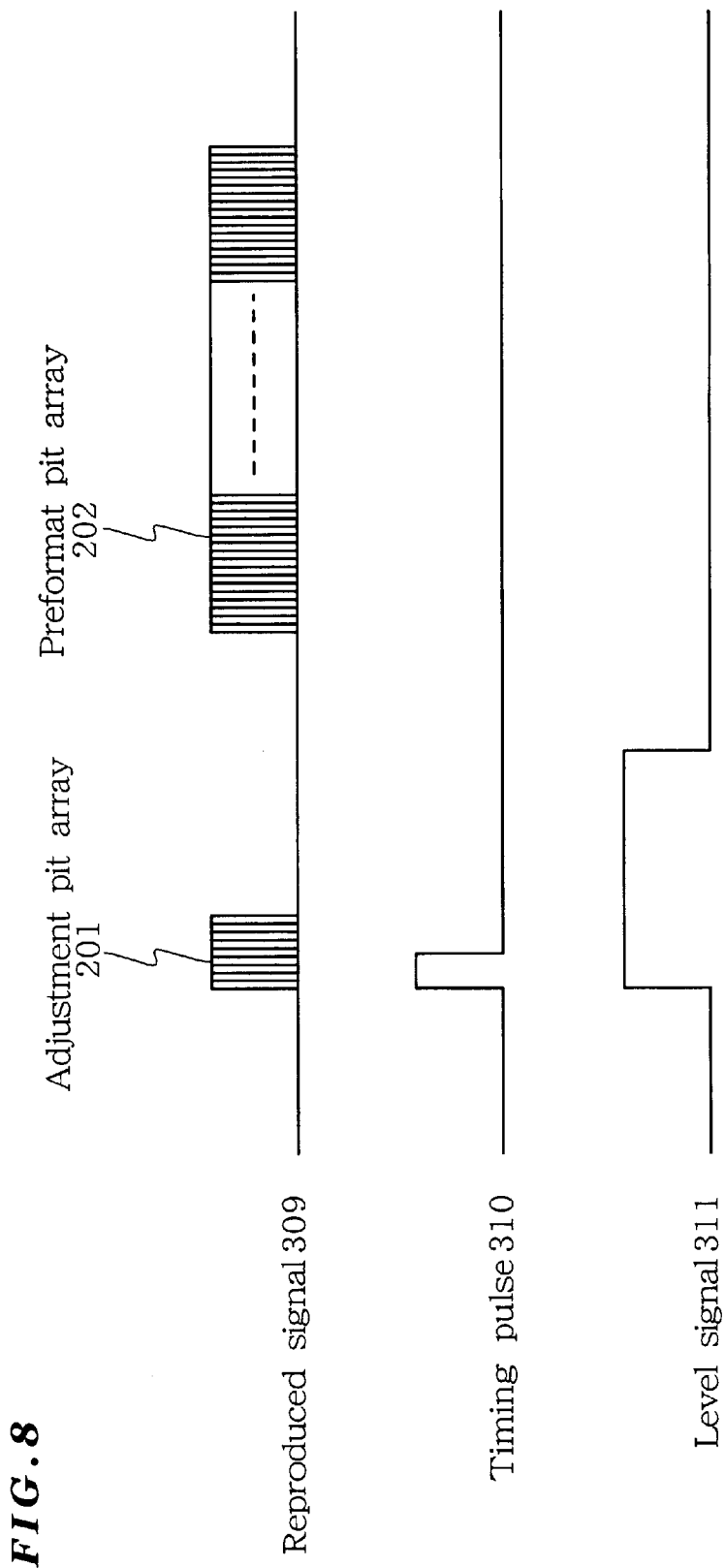
FIG. 8 is a timing chart showing timings for circuit operations of the information reproduction apparatus according to the first embodiment of this invention.

FIG. 8 is a timing chart showing timings for circuit operations of the information reproduction apparatus shown in FIG. 4.

The timing pulse generating circuit 304 detects the rising edge of the reproduced signal 309 from the adjustment pit array 201 and generates a timing pulse 310 that coincides with the rising edge.

In response to the timing pulse 310, the sampling circuit 305 samples and holds the reproduced signal 309 from the adjustment pit array 201 and generates a level signal 311 of a certain pulse width having the sampled voltage.

In response to the level signal 311, the level determining circuit 306 generates such a gain correction signal 312 as to set the amplifying rate of the addition amplifier 307 at a value corresponding to the voltage of the level signal 311.

Thus, the information recorded on the preformat pit array 202 and subsequent sector can be reproduced correctly.

Figure 9:
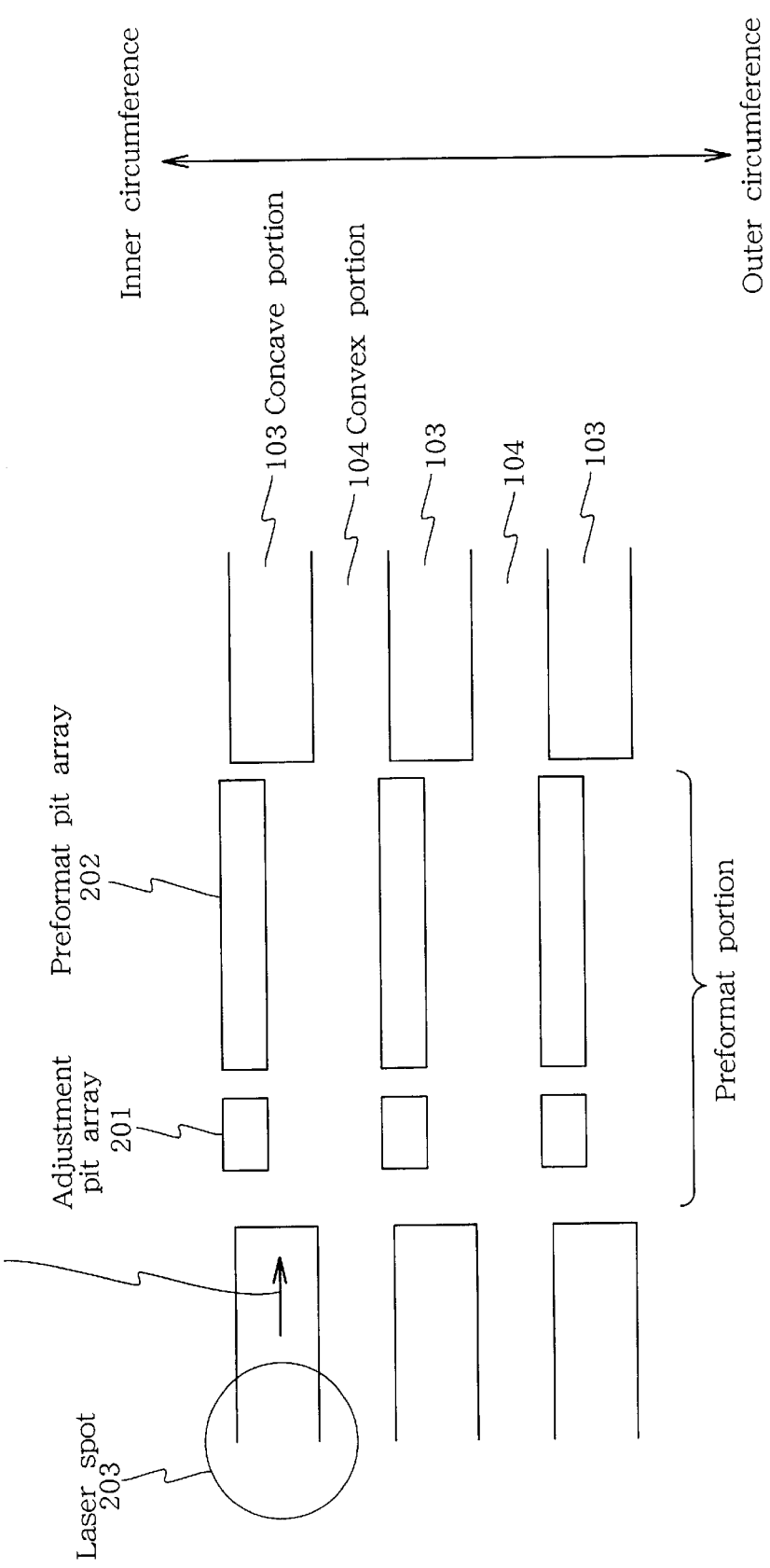
FIG. 9 is an enlarged view of a preformat portion of another information recording medium according to the first embodiment of this invention.

As shown in FIG. 9, the adjustment pit arrays 201 and the preformat pit arrays 202 may be formed from the inner circumference of the disc to its outer circumference on the extension of the boundary where the convex portion 104 shifts to the concave portion 103. In addition, although not shown, the adjustment pit array 201 and the preformat pit array 202 need not be located on the extension of the same boundary.

Figure 10:
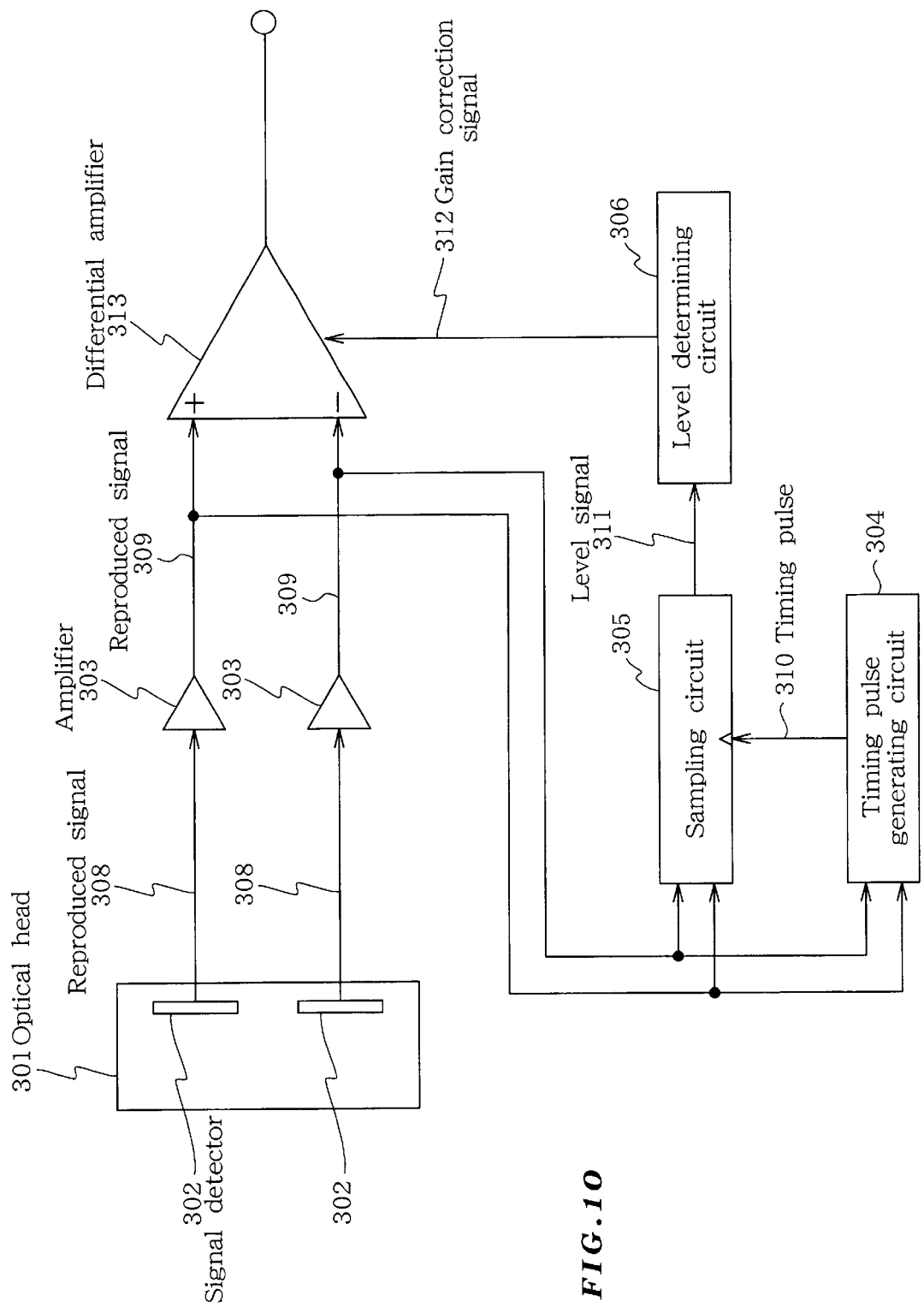
FIG. 10 is a circuit block diagram of another information reproduction apparatus according to the first embodiment of this invention.

In addition, the information reproduction apparatus in FIG. 4 sums up the reproduced signals 309 from the two amplifiers 303 to reproduce information, but to reproduce information by determining the difference between the reproduced signals 309 from the two amplifiers 303, the addition amplifier 307 in FIG. 4 may be replaced by a differential amplifier 313, which is shown in FIG. 10. In this case, if the signal detectors 302 are arranged parallel with the recording tracks as shown in FIG. 5, there is a constant difference between the voltages of the signals from the two signal detectors 302, thereby preventing the information reproduction apparatus from correcting the voltages of the reproduced signals appropriately. Thus, the signal detectors 302 must not be arranged parallel with the laser spot scanning direction. Accordingly, in this case, the signal detectors 302 are arranged perpendicularly or diagonally relative to the recording tracks as shown in FIG. 6 or 7, respectively. The number of the signal detectors 302 may be larger than two. In this case, the level determining circuit 306 also adjusts the gain correction signal 312 according to the voltage of the level signal 311, and sets the amplifying rate of the addition amplifier 307 at a value corresponding to the voltage of the level signal 311.

An information recording medium according to a second embodiment of this invention will be described with reference to the accompanying drawings.

Figure 11:
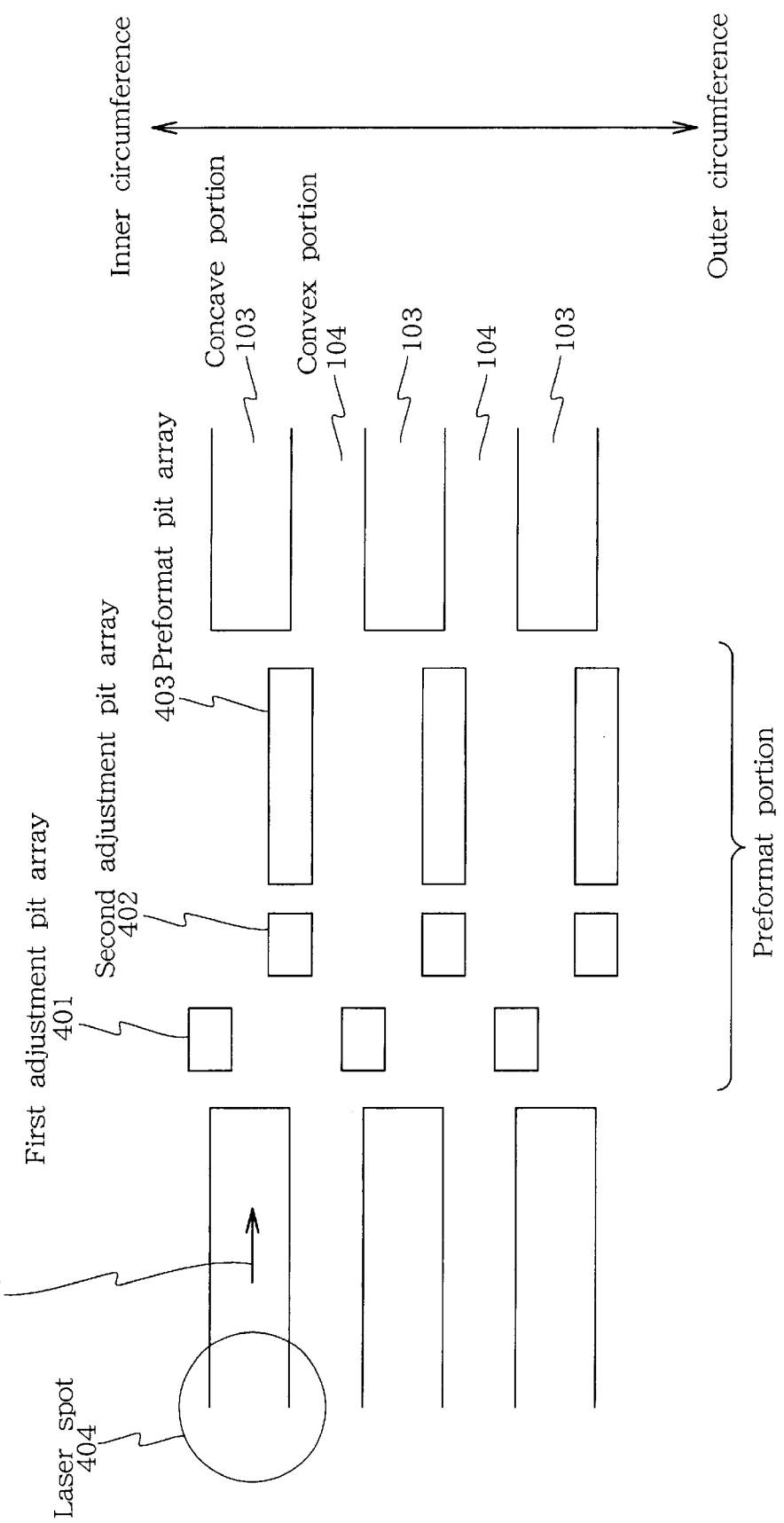
FIG. 11 is an enlarged view of a preformat portion of an information recording medium according to a second embodiment of this invention.

FIG. 11 is an enlarged view of a preformat portion in the information recording medium according to the second embodiment of this invention.

A preformat portion is composed of first adjustment pit arrays 401, second adjustment pit arrays 402, and preformat pit arrays 403, and is formed in a flat portion in which the groove of the concave portion 103 is discontinued. In addition, the first adjustment pit arrays 401 are formed from the inner circumference of the disc to its outer circumference and on the extension of the boundary where the convex portion 104 shifts to the concave portion 103. The second adjustment pit arrays 402 and the preformat pit arrays 403 are formed from the inner circumference of the disc to its outer circumference and on the extension of the boundary where the concave portion 103 shifts to the convex portion 104. The laser spot 404 that records, reproduces, and deletes information scans in the direction shown by an arrow 405.

When the laser spot 404 passes over the first and second adjustment pit arrays 401 and 402, each of the arrays 401 and 402 reflects light of the laser spot 404. The information reproduction apparatus reproduces a signal from the reflected light from each adjustment pit array. The voltages of the respective reproduced signals from the first and second adjustment pit arrays 401 and 402 are equal when the center of the laser spot 404 scans the center of a track and are different when it scans a position offset from the center.

That is, the comparison of the voltages of the respective reproduced signals from the first and second adjustment pit arrays 401 and 402 shows how the center of the laser spot 404 is offset from the center line of the track. Accordingly, the first and second adjustment pit arrays 401 and 402 must each have only a function for reflecting light, and may each comprise an arbitrary length of pit. For example, the adjustment pit array may be an isolated or a continuous pit having a length equivalent to any of the preformat pit arrays 403 or a pit having a length not used for the preformat pit arrays 403.

The configuration of the preformat pit array 403 is the same as the configuration of the preformat pit array 202 in the information recording medium according to the first embodiment shown in FIG. 3. In addition, the preformat pit array 403 exists on the extension of the boundary between the concave portion 103 and the convex portion 104, and is shared by both sectors of the concave and convex portions 103 and 104 as shown in FIG. 11.

In an information recording medium of such a configuration, the center of the laser spot 404 does not pass through the center of the preformat pit array 403 but scans while being shifted either rightward or leftward, as in the information recording medium according to the first embodiment. Accordingly, the variation of the voltage of the reproduced signal caused by an off-track is a problem in reproducing actually recorded information.

Next, an information reproduction apparatus will be described that can prevent the voltage of the reproduced signal from varying using the information recording medium configured as described above.

Figure 12:
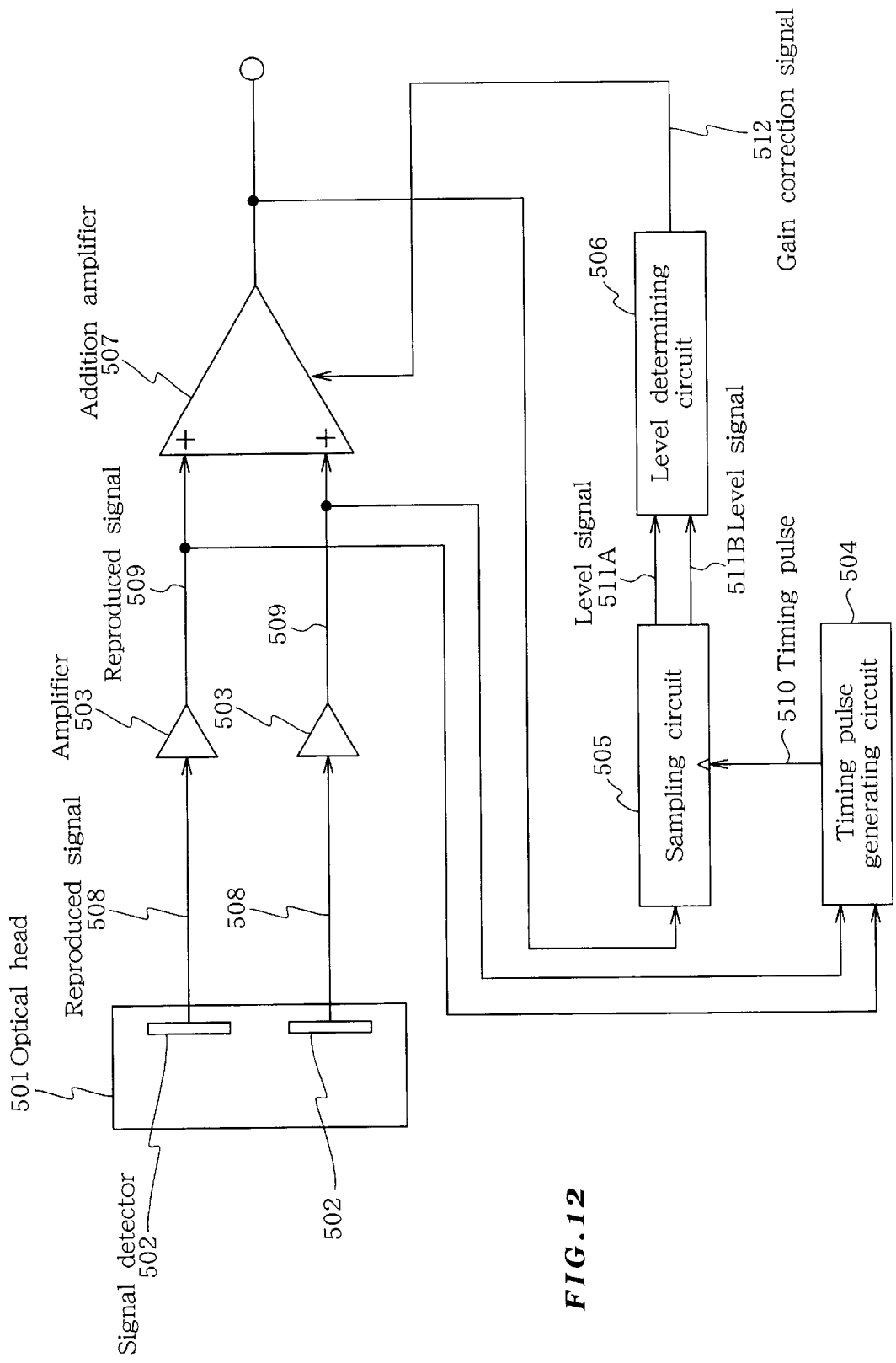
FIG. 12 is a circuit block diagram of an information reproduction apparatus according to the second embodiment of this invention.

This information reproduction apparatus is composed of an optical head 501, two signal detectors 502, two amplifiers 503, a timing pulse generating circuit 504, a sampling circuit 505, a level determining circuit 506, and an addition amplifier 507, as shown in FIG. 12.

The optical head 501 includes two signal detectors (photoelectric transfer elements) 502.

The signal detectors 502 photoelectrically transforms reflected light from the first and second adjustment pit arrays 401 and 402 to generate reproduced signals (voltage signals), and input them to the two amplifiers 503 as reproduced signals 508.

The amplifier 503 amplifies the input reproduced signal 508 at a certain rate to obtain a reproduced signal 509, and outputs it to the timing pulse generating circuit 504 and the addition amplifier 507.

The timing pulse generating circuit 504 detects the rising edges of the respective reproduced signals 509 from the first and second adjustment pit arrays 401 and 402, subsequently generates pulses that coincide with the respective rising edges, and then outputs them to the sampling circuit 505 as timing pulses 510.

In response to the timing pulses 510, the sampling circuit 505 samples and holds the reproduced signals from the first and second adjustment pit arrays 401 and 402, which have been summed up by the addition amplifier 507. The sampling circuit 505 then generates signals of respective certain pulse widths having the sampled voltages. Out of these signals, a signal generated from the first adjustment pit array 401 is named as a level signal 511A and a signal generated from the second adjustment pit array 402 is named as a level signal 511B are outputted to the level determining circuit 506.

Based on the level signals 511A, 511B, the level determining circuit 506 compares the voltages of the reproduced signals from the first and second adjustment pit arrays 401 and 402 to adjust a gain correction signal 512 so as to reproduce the reproduced signals correctly, thereby setting the amplifying rate of the addition amplifier 507.

The addition amplifier 507 sums up the reproduced signals 509 from the two amplifiers 503 and outputs the sum to the sampling circuit 505. The addition amplifier 507 also adjusts the gain according to the gain correction signal 512 and correctly reproduces the reproduced signal from the preformat pit array 403 using this gain.

The signal detectors 502 are arranged at positions suitable for detecting recorded information from reflected light. For example, the signal detectors 502 maybe arranged in parallel with the recording tracks as shown in FIG. 5, perpendicularly to them as shown in FIG. 6, or diagonally relative to them as shown in FIG. 7. The number of the signal detectors 502 may be larger than two.

Figure 13:
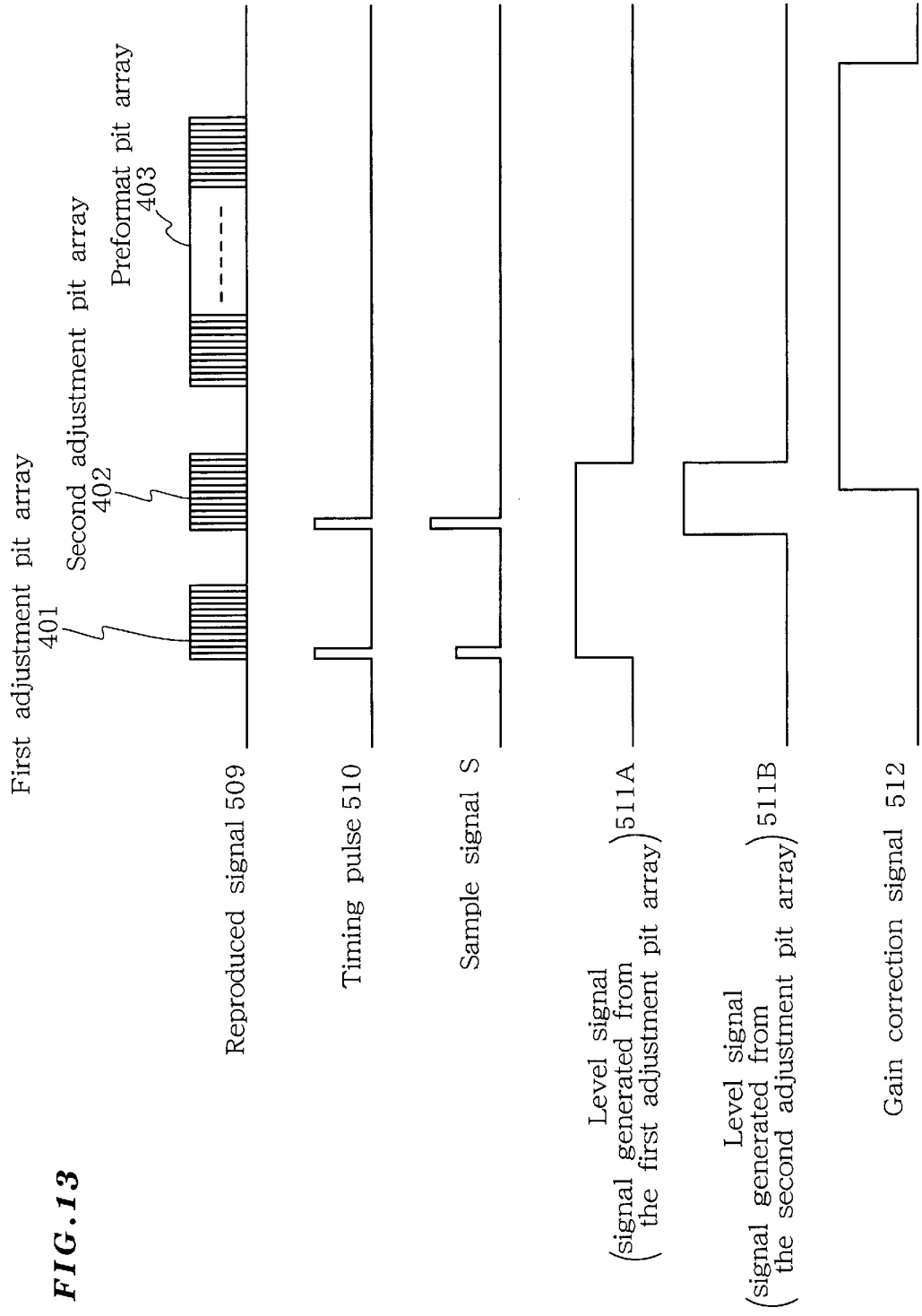
FIG. 13 is a timing chart showing timings for circuit operations of the information reproduction apparatus according to the second embodiment of this invention.

FIG. 13 is a timing chart showing timings for circuit operations of the information reproduction apparatus shown in FIG. 12.

The timing pulse generating circuit 504 detects the rising edges of the respective reproduced signals 509 from the first and second adjustment pit arrays 401 and 402 and generates timing pulses 510 that coincides with the respective rising edges.

In response to the timing pulses 510, the sampling circuit 505 samples and holds the respective reproduced signals from the first and second adjustment pit arrays 401 and 402 so as to generate level signals 511A and 511B and generates sample signals S. Then, based on the sample signals S, the sampling circuit 505 generates level signals 511A and 511B of certain pulse widths having the respective sampled voltages and outputs them to the level determining circuit 506.

The level determining circuit 506 compares the voltages of the level signals 511A, 511B. The level determining circuit 506 generates a gain correction signal 512 such that if the voltage of the level signal 511A is larger than the voltage of the level signal 511B, the level determining circuit 506 increases the amplifying rate of the amplifier 507 by this difference in voltage, whereas if the voltage of the level signal 511A is smaller than the voltage of the level signal 511B, the level determining circuit 506 reduces the amplifying rate of the amplifier 507 by this difference in voltage.

Figure 14:
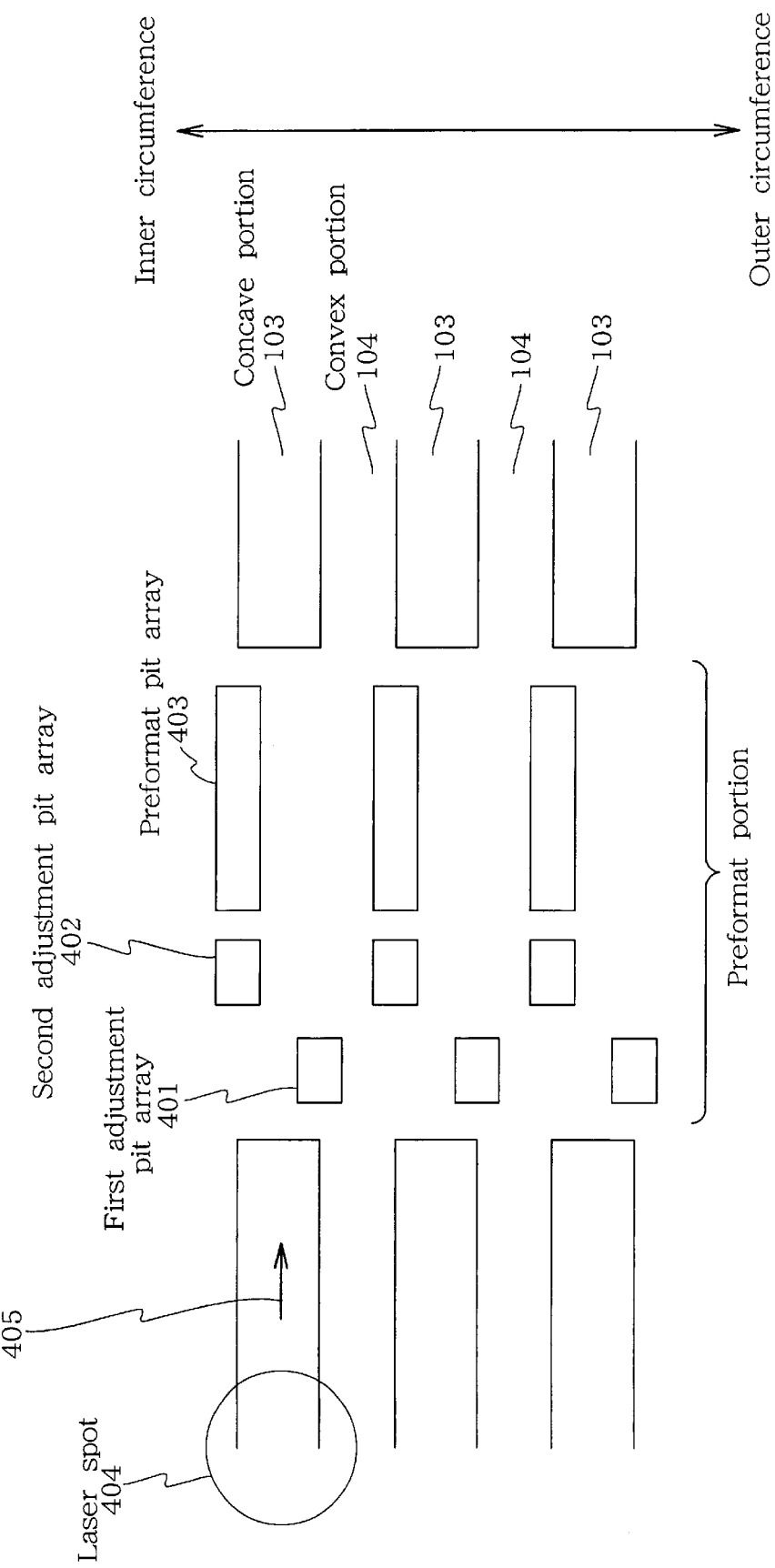
FIG. 14 is an enlarged view of a preformat portion of another information recording medium according to the second embodiment of this invention.

With respect to the first and second adjustment pit arrays 401 and 402 and the preformat pit arrays 403, the first adjustment pit arrays 401 are formed from the inner circumference of the disc to its outer circumference and on the extension of the boundary where the concave portion 103 shifts to the convex portion 104, and the second adjustment pit arrays 402 and the preformat pit arrays 403 are formed from the inner circumference of the disc to its outer circumference and on the extension of the boundary where the convex portion 104 shifts to the concave portion 103, as shown in FIG. 14. In addition, although not shown, the first adjustment pit array 401 and the preformat pit array 403 may be located on the extension of the same boundary and the second adjustment pit array 402 may exist on the extension of the boundary near the preformat pit array 403.

Figure 15:
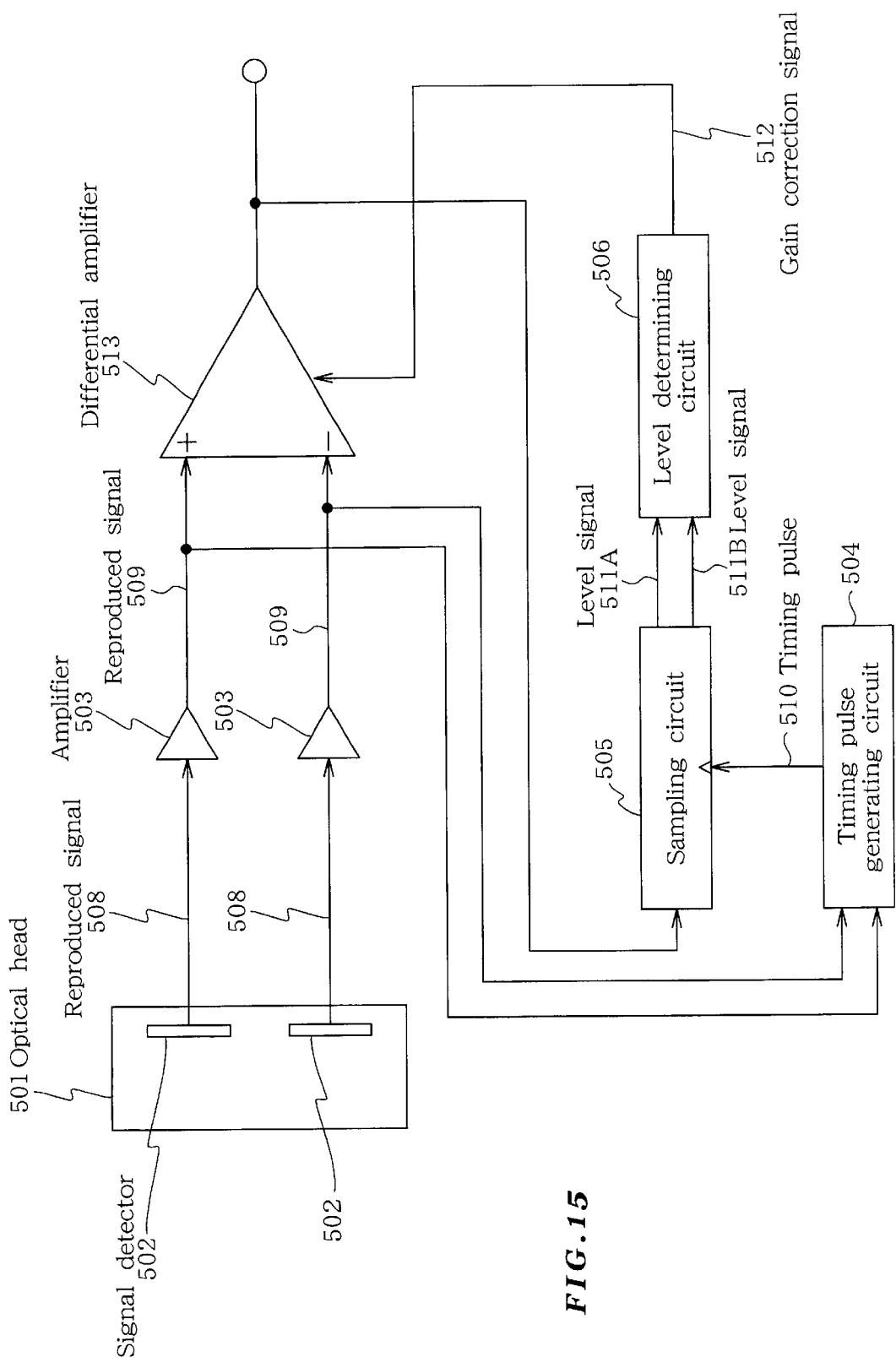
FIG. 15 is a circuit block diagram of another information reproduction apparatus according to the second embodiment of this invention.

In addition, according to the second embodiment, the addition amplifier 507 in FIG. 12 maybe replaced by a differential amplifier 513 in FIG. 15 to determine the difference between the reproduced signals 509 from the two amplifiers 503 in order to compare the voltages of the reproduced signals from the first and second adjustment pit arrays 401 and 402, as in the first embodiment. Also in this case, when the signal detectors 502 are arranged parallel with the laser spot scanning direction, the difference between the voltages of the signals detected by the two signal detectors 502 is constant, as shown in FIG. 5. Thus, since the information reproduction apparatus cannot correct the voltages of the reproduced signals appropriately, the signal detectors 502 must not be arranged parallel with the laser spot scanning direction. Accordingly, in this case, the signal detectors 502 are arranged perpendicularly or diagonally relative to the recording tracks as shown in FIG. 6 or 7, respectively. The number of the signal detectors 502 may be larger than two. In this case, since it is possible for the polarities of the reproduced signals 309 from the first and second adjustment pit arrays 401 and 402 to be different, the level determining circuit 506 may need to reverse the polarity of one of the reproduced signals or includes a function for determining and comparing the absolute values of both voltages. Depending on the difference between the reproduced signals from the first and second adjustment pit arrays 401 and 402 in the magnitude of the potential difference, the level determining circuit 506 sets the amplifying rate for the differential amplifier 507.

In the information reproduction apparatuses shown in the first and second embodiments, the timing pulse generating circuit and the level determining circuit may each have both functions shown in the first and second embodiments.

In addition, the information recording medium from which the information reproduction apparatus shown in the first embodiment reproduces information may be the one shown in the second embodiment.

In addition, the information reproduction apparatus according to this invention may be combined with an apparatus capable of controlling the follow-up of the laser spot, so as to cause the laser spot to correctly scan the track from which information is being reproduced when an off-track occurs.

The configuration of the preformat portion of the present information recording medium is applicable to an information recording medium in which information is recorded on recording tracks as described above, even if the tracks do not form concave and convex portions.

The preformat portion described above is normally formed on a transparent substrate constituting an information recording medium. A magneto-optical recording medium or a phase change recording medium is formed on the transparent substrate.

Next, the configuration of the magneto-optical recording medium or phase change recording medium will be explained with reference to the accompanying drawings.

First, the element symbols and names used in the following description will be described.

These elements are N (nitrogen), O (oxygen), Al (aluminum), Si (silicon), Cr (chromium), Fe (iron), Co (cobalt), Ni (nickel) Zn (zinc), Ge (germanium), In (indium), Sb (antimony), Te (tellurium), Gd (gadolinium), Tb (terbium), Dy (dysprosium), and Ta (tantalum).

Figure 16:
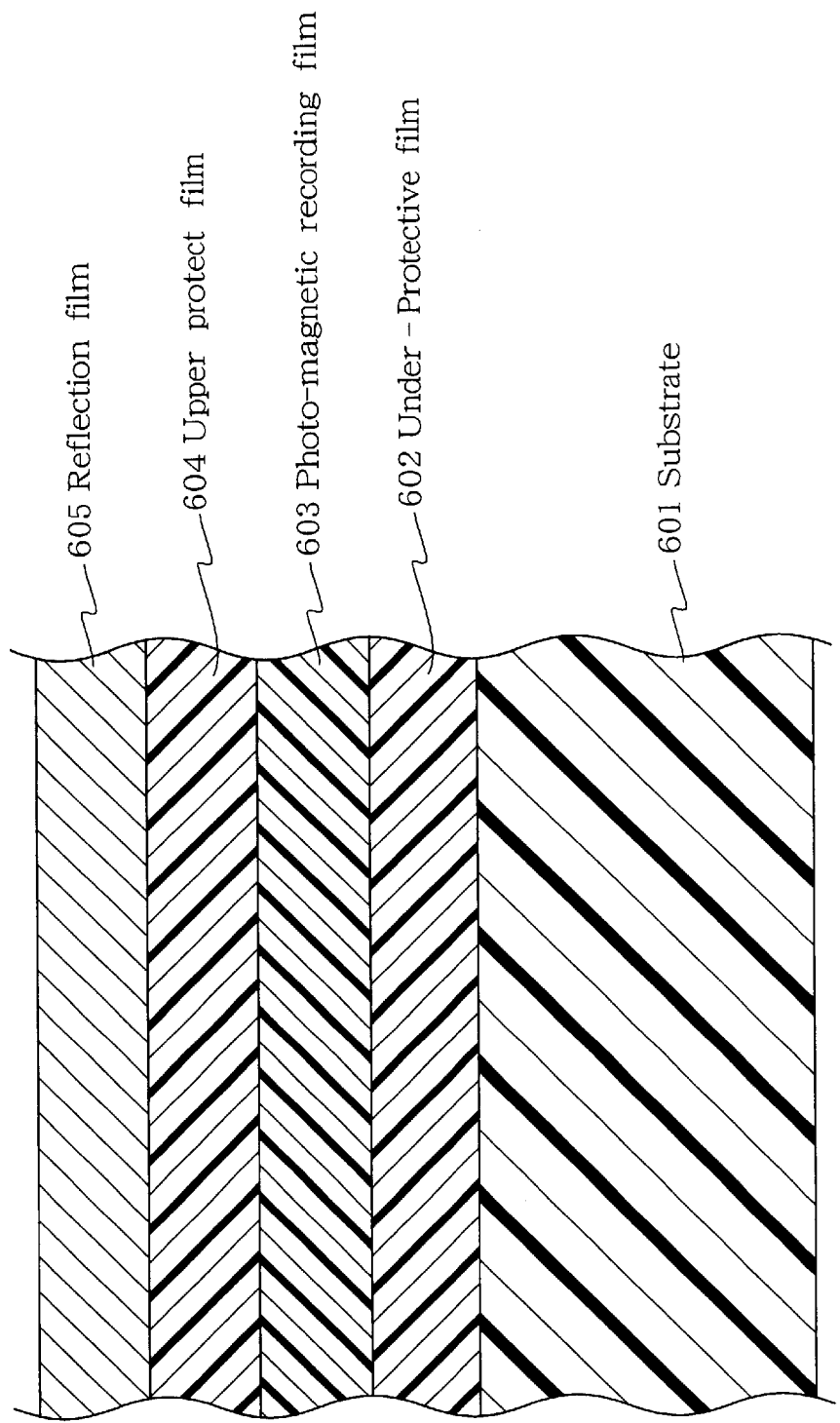
FIG. 16 is a configuration drawing of a cross section obtained by cutting an information recording medium according to the embodiments of this invention, perpendicularly to its surface.

FIG. 16 shows the configuration of a cross section obtained by cutting a magneto-optical recording medium formed on a substrate, perpendicularly to its surface.

The magneto-optical recording medium is formed by sequentially laminating on a transparent substrate 601 at least an under-protective film (substrate protect film) 602, a magneto-optical recording film 603, an upper protective film 604, and a reflection film 605 as shown in FIG. 16.

The material of the magneto-optical recording film 603 is mainly a rare earth and transition metal alloy. Specifically, the magneto-optical film 603 may be formed of one or more of TbFe, TbFeCo, GdTbFeCo, DyTbFeCo, GdDyTbFeCo, and DyTbCo.

The materials of the under-protective film 602 and the upper protect film 604 are SiN, SiO, $SiO_2$, AlN, and TaO, and the protect film may be formed of one of these materials, or may be a composite film or multiple films comprising these materials.

The material of the reflection film 605 is Al, AlTi, or Al—Cr.

Figure 17:
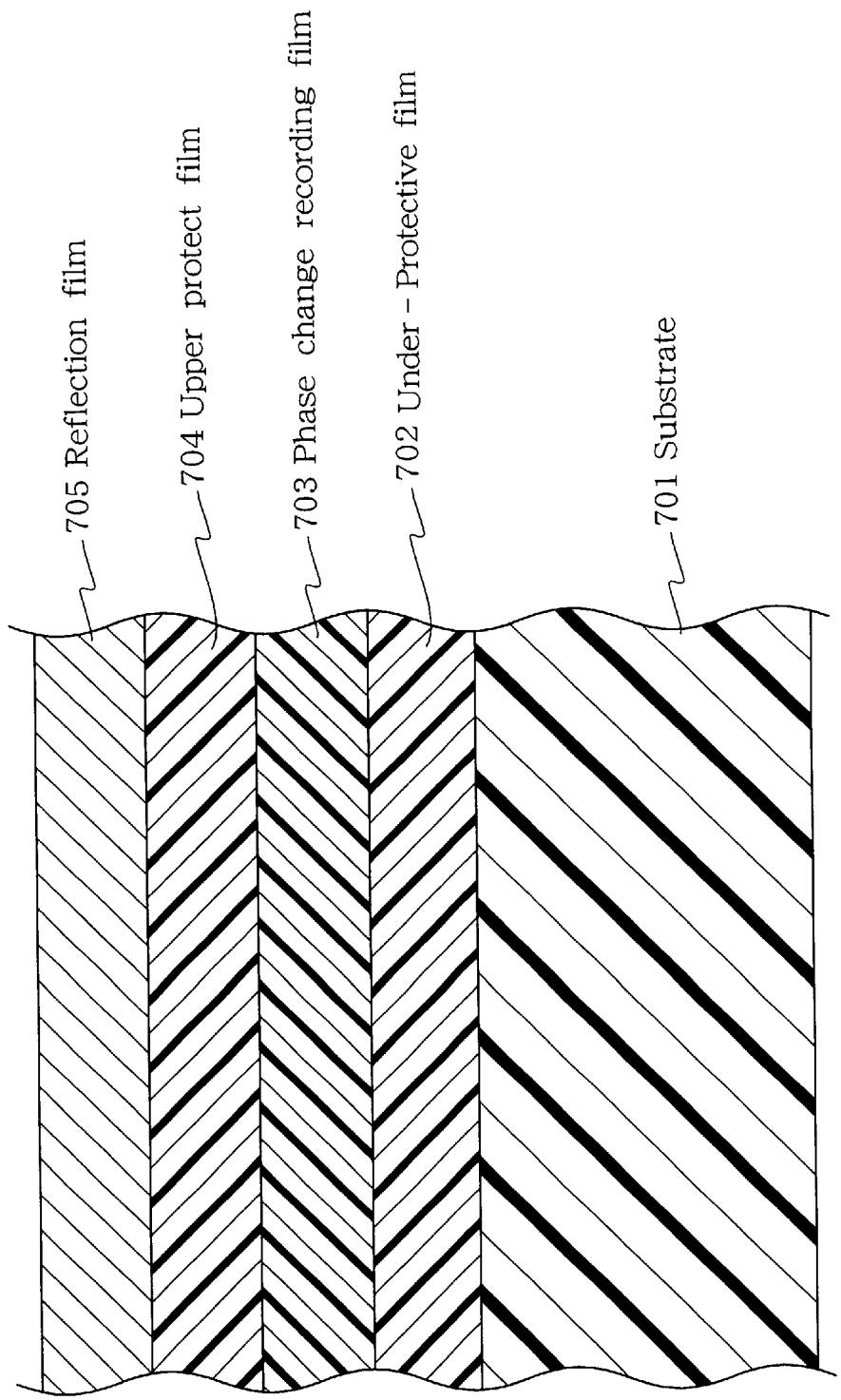
FIG. 17 is another configuration drawing of a cross section obtained by cutting an information recording medium according to the embodiments of this invention, perpendicularly to its surface.
Figure 18:
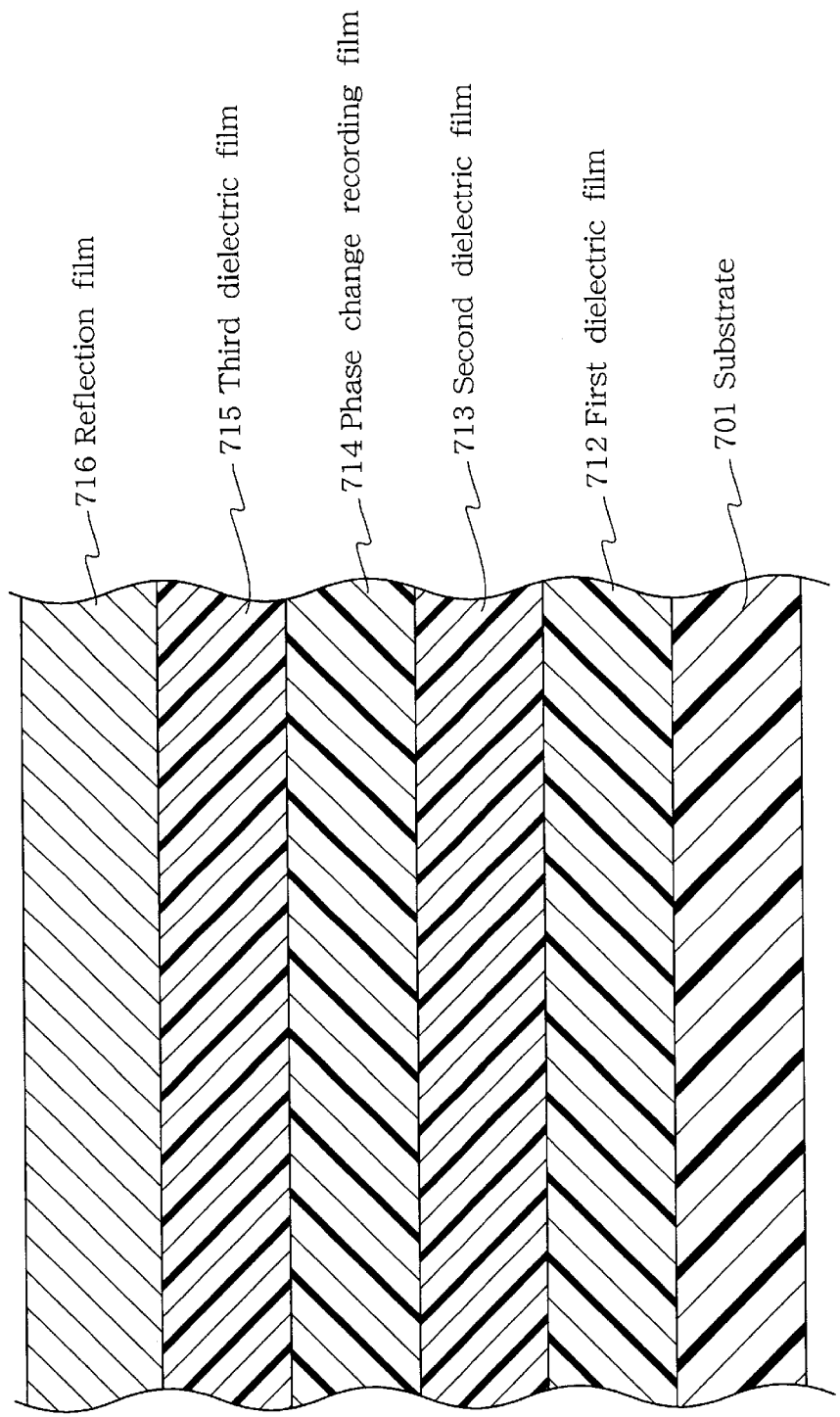
FIG. 18 is another configuration drawing of a cross section obtained by cutting an information recording medium according to the embodiments of this invention, perpendicularly to its surface.

FIGS. 17 and 18 show the configuration of a cross section obtained by cutting a phase change recording medium formed on a substrate, perpendicularly to its surface.

The phase change recording medium is formed by sequentially laminating on a substrate 701 at least an under-protective film 702, a phase change recording film 703, an upper protect film 704, and a reflection film 705 as shown in FIG. 17. Alternatively, the phase change recording medium may be formed by sequentially laminating on the substrate 701 at least a first dielectric film 712, a second dielectric film 713, a phase change recording film 714, a third dielectric film 715, and a reflection film 716, as shown in FIG. 18.

The phase change recording films 703, 714 mainly consist of a chalcogenide material. Specifically, the chalcogenide material refers to GeSbTe, GeTe, or InSbTe.

The under-protective film 702, the upper protect film 704, the first dielectric film 712, the second dielectric film 713, and the third dielectric film 715 mainly consist of ZnS, ZnS—$SiO_2$, SiN, SiO, AlN, or TaO. These films may each be formed of one of these materials, or may be multiple films or a composite film comprising these materials.

The reflection films 705, 716 are mainly formed of Al, Al—Ti, Al—Cr, Ni—Cr, Si, Ge, or an oxide or nitride mainly consisting of Si or Ge.

The materials of the respective films constituting the information recording medium are not limited to those listed above but may be any other ones as long as they provide the same functions.

As described above, by using the simple configuration to correct the variation of the signal level from the preformat pit or the variation of the signal level caused by an off-track, this invention can correctly reproduce information despite the reduction of the track pitch, thereby enabling the capacity for recorded information to be substantially increased.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 10-190074 (Filed on Jul. $6^{th}$, 1998) including specification, claims, drawings and summary are incorporated herein by reference in its entirety.

What is claimed is:

1. An information recording medium comprising:
   a recording surface having adjacent recording tracks sandwiching a boundary therebetween;
   a preformat pit array on an extension of the boundary between adjacent recording tracks on said recording surface, said preformat pit array containing information on both recording tracks sandwiching the boundary; and an adjustment pit region on said recording surface at a position prior to said preformat pit array relative to the advancing direction of light that reproduces recorded information from said recording surface, said adjustment pit region providing information for adjusting the signal level of a reproduced signal from said preformat pit array.

2. The information recording medium according to claim 1, wherein said adjustment pit region comprises a single or a plurality of pit arrays formed at the extension of the same boundary between adjacent tracks as said preformat pit array or on the extension of an adjacent boundary.

3. The information reproduction apparatus for reproducing information recorded on an information recording medium according to claim 1, comprising:

a reproduction circuit to reproduce a signal recorded on the information recording medium by photoelectrically transforming light from the information recording medium;

an amplifying circuit for amplifying the signal reproduced by said reproduction circuit;

a level determining circuit for detecting the reproduced signal from the adjustment pit region out of the output signal from said reproduction circuit and determining the signal level of the reproduced adjustment pit array signal; and an amplifying rate adjustment circuit for adjusting the amplifying rate of said amplifying circuit according to the signal level determined by said level determining circuit, and for outputting the reproduced signal from said preformat pit array at a certain signal level.

4. The information reproduction apparatus for reproducing information recorded on an information recording medium according to claim 2, comprising:

a reproduction circuit to reproduce a signal recorded on the information recording medium by photoelectrically transforming light from the information recording medium;

an amplifying circuit for amplifying the signal reproduced by said reproduction circuit;

a level determining circuit for detecting the reproduced signal from the single adjustment pit array or the plurality of adjustment pit arrays out of the output signal from said reproduction and determining the signal level of the reproduced signal; and an amplifying rate adjustment circuit for adjusting the amplifying rate of said amplifying circuit according to the signal level determined by said level determining circuit, and for outputting the reproduced signal from said preformat pit array at a certain signal level.

5. The information reproduction apparatus according to claim 3, wherein:

said reproduction circuit comprises a plurality of reproduction sections; and said amplifying circuit amplifies the sum of the signal levels of signals reproduced by said plurality of reproduction sections or the difference between the signal levels of signals reproduced by said plurality of reproduction sections.

6. The information reproduction apparatus according to claim 4 wherein:

said reproduction circuit comprises a plurality of reproduction sections; and said amplifying circuit amplifies the sum of the signal levels of signals reproduced by said plurality of reproduction sections or the difference between the signal levels of signals reproduced by said plurality of reproduction sections.

7. The information reproduction apparatus for reproducing information recorded on an information recording medium according to claim 1, comprising:

a reproduction circuit for reproducing signals recorded on the information recording medium, from light from the information recording medium;

an amplifying circuit for amplifying the signals reproduced by said reproduction circuit;

a level determining circuit for determining the signal level of each reproduced signal by detecting the reproduced signals resulting from the adjustment pit region on the extension of the same boundary between adjacent tracks as the preformat pit array and on the extension of an adjacent boundary; and an amplifying rate adjustment circuit for adjusting the amplifying rate of said amplifying circuit according to the signal level determined by said level determining circuit, and for outputting the reproduced signals from said preformat pit array at certain signal levels.

8. The information reproduction apparatus for reproducing information recorded on an information recording medium according to claim 2, comprising:

a reproduction circuit for reproducing signals recorded on the information recording medium, from light from the information recording medium;

an amplifying circuit for amplifying the signals reproduced by said reproduction circuit;

a level determining circuit for determining the signal level of each reproduced signal by detecting the reproduced signals resulting from the adjustment pit region on the extension of the same boundary between adjacent tracks as the preformat pit array and on the extension of an adjacent boundary; and an amplifying rate adjustment circuit for adjusting the amplifying rate of said amplifying circuit according to the signal level determined by said level determining circuit, and for outputting the reproduced signals from said preformat pit array at certain signal levels.

9. The information reproduction apparatus according to claim 7, wherein:

said reproduction circuit comprises a plurality of reproduction sections; and said level determining circuit determines the signal levels of the reproduced signals based on the sum of the signal levels of signals reproduced by said plurality of reproduction sections or the difference between the signal levels of signals reproduced by said plurality of reproduction sections.

10. The information reproduction apparatus according to claim 7, wherein:

said reproduction circuit comprises a plurality of reproduction sections; and said amplifying circuit amplifies the sum of the signal levels of signals reproduced by said plurality of reproduction sections or the difference between the signal levels of signals reproduced by said plurality of reproduction sections.

11. The information reproduction apparatus according to claim 8, wherein:

said reproduction circuit comprises a plurality of reproduction sections; and said amplifying circuit amplifies the sum of the signal levels of signals reproduced by said plurality of reproduction sections or the difference between the signal levels of signals reproduced by said plurality of reproduction sections.

12. The information reproduction apparatus according to claim 8, wherein:

said reproduction circuit comprises a plurality of reproduction sections; and said level determining circuit determines the signal levels of the reproduced signals based on the sum of the signal levels of signals reproduced by said plurality of reproduction sections or the difference between the signal levels of signals reproduced by said plurality of reproduction sections.

13. The information recording medium according to claim 1, wherein the adjustment pit array causes correction of the reproduced signal from the preformat pit array so as to have a signal level required to accurately reproduce information.

14. The information recording medium according to claim 1, wherein the adjustment pit array and the preformat pit array are formed on the extension of the boundary where a concave portion shifts to a convex portion.

15. The information reproduction apparatus according to claim 5, wherein the sum of the signal levels of signals reproduced by said plurality of reproduction sections or the difference between the signal levels of signals reproduced by said plurality of reproduction sections is indicative of a position offset of the light from the center of a track.

16. An information recording medium comprising:

a recording surface having adjacent recording tracks sandwiching a boundary therebetween;

a preformat pit array on an extension of the boundary between adjacent recording tracks on said recording surface, said preformat pit array containing information on both recording tracks sandwiching the boundary; and an adjustment pit region on said recording surface at a position prior to said preformat pit array relative to the advancing direction of light that reproduces recorded information from said recording surface, said adjustment pit region formed on both the extension of the same boundary between adjacent tracks as said preformat pit array and the extension of an adjacent boundary, said adjustment pit region providing information for adjusting the signal level of a reproduced signal from said preformat pit array.

17. The information recording medium according to claim 16, wherein said adjustment pit array comprises a single pit or an array of pits.

18. The information reproduction apparatus for reproducing information recorded on an information recording medium according to claim 16, comprising:

a reproduction circuit to reproduce a signal recorded on the information recording medium by photo-electrically transforming light from the information recording medium;

an amplifying circuit for amplifying the signal reproduced by said reproduction circuit;

a level determining circuit for detecting the reproduced signal coming from the adjustment pit region out of the output signal from said reproduction circuit in order to determine the signal level of the reproduced signal; and an amplifying rate adjustment circuit for adjusting the amplifying rate of said amplifying circuit according to the signal level determined by said level determining circuit, and for outputting the reproduced signal from said preformat pit array at a certain signal level.

19. The information reproduction apparatus for reproducing information recorded on an information recording medium according to claim 17, comprising:

a reproduction circuit to reproduce a signal recorded on the information recording medium by photo-electrically transforming light from the information recording medium;

an amplifying circuit for amplifying the signal reproduced by said reproduction circuit;

a level determining circuit for detecting the reproduced signal coming from the adjustment pit region out of the output signal from said reproduction circuit in order to determine the signal level of the reproduced signal; and an amplifying rate adjustment circuit for adjusting the amplifying rate of said amplifying circuit according to the signal level determined by said level determining circuit, and for outputting the reproduced signal from said preformat pit array at a certain signal level.

20. The information reproduction apparatus according to claim 18 wherein:

said reproduction circuit comprises a plurality of reproduction sections; and said amplifying circuit amplifies the sum of the signal levels of signals reproduced by said plurality of reproduction sections or the difference between the signal levels of signals reproduced by said plurality of reproduction sections.

21. The information reproduction apparatus according to claim 19 wherein:

said reproduction circuit comprises a plurality of reproduction sections; and said amplifying circuit amplifies the sum of the signal levels of signals reproduced by said plurality of reproduction sections or the difference between the signal levels of signals reproduced by said plurality of reproduction sections.

22. The information reproduction apparatus for reproducing information recorded on an information recording medium according to claim 16, comprising:

a reproduction circuit for reproducing signals recorded on the information recording medium, from light from the information recording medium;

an amplifying circuit for amplifying the signals reproduced by said reproduction circuit;

a level determining circuit for determining the signal level of each reproduced signal by detecting the reproduced signals resulting from the adjustment pit region on the extension of the same boundary between adjacent tracks as said preformat pit array and on the extension of the adjacent boundary; and an amplifying rate adjustment circuit for adjusting the amplifying rate of said amplifying circuit according to the signal level determined by said level determining circuit, and for outputting the reproduced signals from said preformat pit array at certain signal levels.

23. The information reproduction apparatus for reproducing information recorded on an information recording medium according to claim 17, comprising:

a reproduction circuit for reproducing signals recorded on the information recording medium, from light from the information recording medium;

an amplifying circuit for amplifying the signals reproduced by said reproduction means;

a level determining circuit for determining the signal level of each reproduced signal by detecting the reproduced signals resulting from the adjustment pit region on the extension of the same boundary between adjacent tracks as said preformat pit array and on the extension of the adjacent boundary; and an amplifying rate adjustment circuit for adjusting the amplifying rate of said amplifying circuit according to the signal level determined by said level determining circuit, and for outputting the reproduced signals from said preformat pit array at certain signal levels.

24. The information reproduction apparatus according to claim 22, wherein:

said reproduction circuit comprises a plurality of reproduction sections; and said level determining circuit determines the signal levels of the reproduced signals based on the sum of the signal levels of signals reproduced by said plurality of reproduction sections or the difference between the signal levels of signals reproduced by said plurality of reproduction sections.

25. The information reproduction apparatus according to claim 23, wherein:

said reproduction circuit comprises a plurality of reproduction sections; and said level determining circuit determines the signal levels of the reproduced signals based on the sum of the signal levels of signals reproduced by said plurality of reproduction sections or the difference between the signal levels of signals reproduced by said plurality of reproduction sections.

26. The information reproduction apparatus according to claim 22, wherein:

said reproduction circuit comprises a plurality of reproduction sections; and said amplifying circuit amplifies the sum of the signal levels of signals reproduced by said plurality of reproduction sections or the difference between the signal levels of signals reproduced by said plurality of reproduction sections.

27. The information reproduction apparatus according to claim 23, wherein:

said reproduction circuit comprises a plurality of reproduction sections; and said amplifying circuit amplifies the sum of the signal levels of signals reproduced by said plurality of reproduction sections or the difference between the signal levels of signals reproduced by said plurality of reproduction sections.

28. The information recording medium according to claim 16, wherein the adjustment pit array causes correction of the reproduced signal from the preformat pit array so as to have a signal level required to accurately reproduce information.

29. The information recording medium according to claim 16, wherein the adjustment pit array provides a signal having a level indicative of the deviation of the center of the light from a center line of a track.

30. The information recording medium according to claim 16, wherein the adjustment pit array and the preformat pit array are formed on the extension of the boundary where a concave portion shifts to a convex portion.

* * * * *